United States Patent
Kii

(10) Patent No.: US 7,698,350 B2
(45) Date of Patent: Apr. 13, 2010

(54) REPRODUCING APPARATUS, REPRODUCTION CONTROLLING METHOD, AND PROGRAM

(75) Inventor: Manabu Kii, Tokyo (JP)

(73) Assignee: Sony Corporation, Tokyo (JP)

(*) Notice: Subject to any disclaimer, the term of this patent is extended or adjusted under 35 U.S.C. 154(b) by 302 days.

(21) Appl. No.: 11/403,985

(22) Filed: Apr. 14, 2006

(65) Prior Publication Data

US 2007/0174568 A1 Jul. 26, 2007

(30) Foreign Application Priority Data

Apr. 18, 2005 (JP) ............... 2005-120316

(51) Int. Cl.
*G06F 17/30* (2006.01)
(52) U.S. Cl. ..................... 707/822; 707/823
(58) Field of Classification Search .............. None
See application file for complete search history.

(56) References Cited

U.S. PATENT DOCUMENTS

2002/0041752 A1* 4/2002 Abiko et al. ............ 386/46
2002/0059220 A1* 5/2002 Little ...................... 707/5
2004/0078383 A1* 4/2004 Mercer et al. ............ 707/102
2005/0044091 A1* 2/2005 Nakamura et al. ........ 707/100

FOREIGN PATENT DOCUMENTS

| JP | 2001-175624 | 6/2001 |
|---|---|---|
| JP | 2001-326867 | 11/2001 |
| JP | 2001-333358 | 11/2001 |
| JP | 2003-153141 | 5/2003 |
| JP | 2003-244565 | 8/2003 |
| JP | 2004-140536 | 5/2004 |
| WO | WO 2004/002145 | 12/2003 |

* cited by examiner

*Primary Examiner*—Pierre M Vital
*Assistant Examiner*—Truong V Vo
(74) *Attorney, Agent, or Firm*—Finnegan, Henderson, Farabow, Garrett & Dunner, L.L.P.

(57) ABSTRACT

A reproducing apparatus is disclosed which includes: a grouping section configured to group a plurality of content data stored on a storage medium into a plurality of content groups; a group selection section configured to select one of the plurality of content groups in response to an input from a user; and a reproduction control section configured to reproduce one of a plurality of content data belonging to one content group selected by the group selection section, for output starting from a point in time of the selection.

16 Claims, 16 Drawing Sheets

$t_C$ : POINT IN TIME OF CHANGEOVER FROM CHANNEL A TO CHANNEL B

▱ : CONTENT HAVING BEEN REPRODUCED UP TO CHANGEOVER

▰ : CONTENT REPRODUCED UPON CHANNEL CHANGEOVER

REPRODUCING APPARATUS, REPRODUCTION CONTROLLING METHOD, AND PROGRAM

CROSS REFERENCES TO RELATED APPLICATIONS

The present invention contains subject matter related to Japanese Patent Application JP 2005-120316 filed with the Japanese Patent Office on Apr. 18, 2005, the entire contents of which being incorporated herein by reference.

BACKGROUND OF THE INVENTION

The present invention relates to a reproducing apparatus, a reproduction controlling method, and a program for reproducing a plurality of content data stored on a storage medium.

Recent years have witnessed widespread acceptance of reproducing apparatuses such as portable players each equipped with an internal hard disk drive capable of reproducing digital content data including music contents (simply called contents hereunder) delivered by EMD (electronic music distribution) servers or like sources. This type of reproducing apparatus can accommodate a very large number (e.g., thousands or tens of thousands) of contents thanks to the ever-growing capacity of the internal storage medium.

When the user of such a reproducing apparatus wanted to reproduce contents, it was customary to select the desired contents on a content by content basis. For example, Japanese Patent Laid-open No. 2001-175624 discloses arrangements whereby a list of a plurality of contents (with content names, reproduction times, etc.) stored in an information processing apparatus acting as a reproducing apparatus is displayed on a screen of that apparatus so that the user may selectively input desired contents one at a time (e.g., by selectively scrolling selection icons on the screen) for reproduction purposes. That is, typical reproducing apparatuses have required that a plurality of contents be first selected from storage before they could be reproduced.

SUMMARY OF THE INVENTION

Whereas reproducing apparatuses of the above-mentioned type have huge numbers of contents stored on their storage medium, users are required initially to select desired contents before getting them reproduced. Where a large number of contents are to be reproduced, the operations necessary for their reproduction can become complicated. This often forces the user to select and reproduce only limited contents, leaving numerous other contents unutilized. As a result, the user tends to have few opportunities to enjoy contents which have not been accessed so far and which could match the user's preferences if monitored.

The above-mentioned arrangements involve initially selecting contents before they are to be reproduced. It is thus up to the user to determine which contents to reproduce. Such traditional techniques have failed to satisfy the typical user's passive desire to let contents be selected without having to specify any particular preferences.

One way of reproducing contents without the user's intervention is known as "shuffle (random) reproduction," whereby a plurality of contents stored on the storage medium are selected and reproduced automatically and randomly.

The shuffle reproduction allows the user randomly to monitor the initial part of each content (e.g., the beginning of each music content) but does not permit access to a predetermined position of a given content unless the user asserts his or her willingness to reproduce continuously the content in question; the predetermined position is illustratively the highlight portion of a music content serving as a criterion by which the user determines whether or not the content in question satisfies his or her taste. Furthermore, since the shuffle reproduction involves continuously reproducing a plurality of contents in a single stream, it takes quite a long time to reproduce the numerous contents entirely. The result is that the shuffle reproduction offers only a low possibility that contents matching the user's preferences will be reproduced by chance and appreciated.

The present invention has been made in view of the above circumstances and provides a reproducing apparatus, a reproduction controlling method, and a program offering improvements allowing a user passively to monitor a very large number of contents reproduced from a storage medium on a randomly changed basis through simple operations of the user, with no need for the user individually to select contents for reproduction according to his or her discretion.

In carrying out the present invention and according to one embodiment thereof, there is provided a reproducing apparatus including: a grouping section configured to group a plurality of content data stored on a storage medium into a plurality of content groups; a group selection section configured to select one of the plurality of content groups in response to an input from a user; and a reproduction control section configured to reproduce one of a plurality of content data belonging to one content group selected by the group selection section, for output starting from a point in time of the selection.

Where the reproducing apparatus above according to the invention is in use, a very large number of contents stored on the storage medium are grouped into a plurality of content groups. Content streams each made up of a series of contents belonging to each of the content groups are then reproduced either in parallel, or are processed in such a manner that, of the content streams being processed, one stream representative of one selected content group is actually reproduced and output. The content streams can be changed easily for output by simply selecting different content groups. Such arrangements reduce the complexity of the user's selection operations; they allow the user passively to monitor huge numbers of contents held on the storage medium through simple operations of content changeover.

Preferably, upon selection of the one content group by the group selection section, the reproduction control section may reproduce and output the content data belonging to the selected content group and corresponding to that point in time which would be reached upon content group selection if a plurality of content data belonging to the selected content group had been reproduced in a sequentially continuous manner starting from a reproduction starting time earlier than the selection of the one content group. The "reproduction in a sequentially continuous manner" refers to a process in which a plurality of content data belonging to one content group is reproduced continuously in a predetermined sequence.

Preferably, the reproduction control section may include: a plurality of reproduction sections configured to reproduce a plurality of content data belonging to each of the content groups in a sequentially continuous manner starting from the reproduction starting time; and a reproduction output changeover section configured to selectively output the reproduced data which is input to the reproduction section corresponding to one content group selected by the group selection section, starting from the point in time of the selection.

Preferably, the reproduction control section may include: a reproduction content determination section configured to determine, based on an elapsed time counted since the reproduction starting time, the content data belonging to one content group selected by the group selection section, the determined content data corresponding to that point in time which would be reached upon content group selection if a plurality of content data belonging to the selected content group had been reproduced in a sequentially continuous manner starting from the reproduction starting time; and a reproduction section configured to reproduce and output the content data determined by the reproduction content determination section.

The reproduction section may preferably reproduce the content data determined by the reproduction content determination section starting from a starting position of the content data.

The reproduction section may preferably reproduce the content data determined by the reproduction content determination section starting from a position corresponding to the point in time of the selection.

The reproduction section may preferably reproduce the content data determined by the reproduction content determination section starting from a predetermined position representative of a feature part of the determined content data.

The grouping section may preferably group the plurality of content data into the plurality of content groups based on a selection input from the user.

The grouping section may preferably group the plurality of content data into the plurality of content groups based on information representative of a content data attribute.

The grouping section may preferably group the plurality of content data into the plurality of content groups based on a content data monitoring frequency.

Preferably, the grouping section may group the plurality of content data into the plurality of content groups in such a manner that the content data with a high monitoring frequency and the content data with a low monitoring frequency are distributed substantially on an evenly distributed basis.

The grouping section may preferably group the plurality of content data randomly into the plurality of content groups.

Preferably, the reproduction starting time may be a point in time at which the reproduction control section is started.

Preferably, the reproduction starting time may be a point in time at which one content group is initially selected by the group selection section following start-up of the reproduction control section.

Preferably, the reproduction control section may reproduce one content group selected by the group selection section starting from a highlight portion of one of a plurality of content data belonging to the selected content group.

According to another embodiment of the present invention, there is provided a reproduction controlling method including the steps of: grouping a plurality of content data stored on a storage medium into a plurality of content groups; firstly reproducing, in a sequentially continuous manner, a plurality of content data belonging to one of the plurality of content groups for output starting from a predetermined reproduction starting time; selecting a different one of the plurality of content groups in place of the one content group in response to an input from a user; and secondly reproducing one of a plurality of content data belonging to the different content group selected in the group selecting step, for output starting from a point in time of the selection.

According to a further embodiment of the present invention, there is provided a program for causing a computer to carry out a procedure including the steps of: grouping a plurality of content data stored on a storage medium into a plurality of content groups; selecting one of the plurality of content groups in response to an input from a user; and reproducing one of a plurality of content data belonging to one content group selected in the group selecting step, for output starting from a point in time of the selection.

According to the present invention, as outlined above, the user wishing to reproduce a very large number of contents from a storage medium is allowed simply to change desired content groups to be monitored instead of individually selecting contents through complicated and tiresome operations. These numerous contents can be continuously reproduced as a stream per content group for passive monitoring by the user.

BRIEF DESCRIPTION OF THE DRAWINGS

Further objects and advantages of the present invention will become apparent upon a reading of the following description and appended drawings in which.

DETAILED DESCRIPTION OF THE PREFERRED EMBODIMENTS

Figure 1:
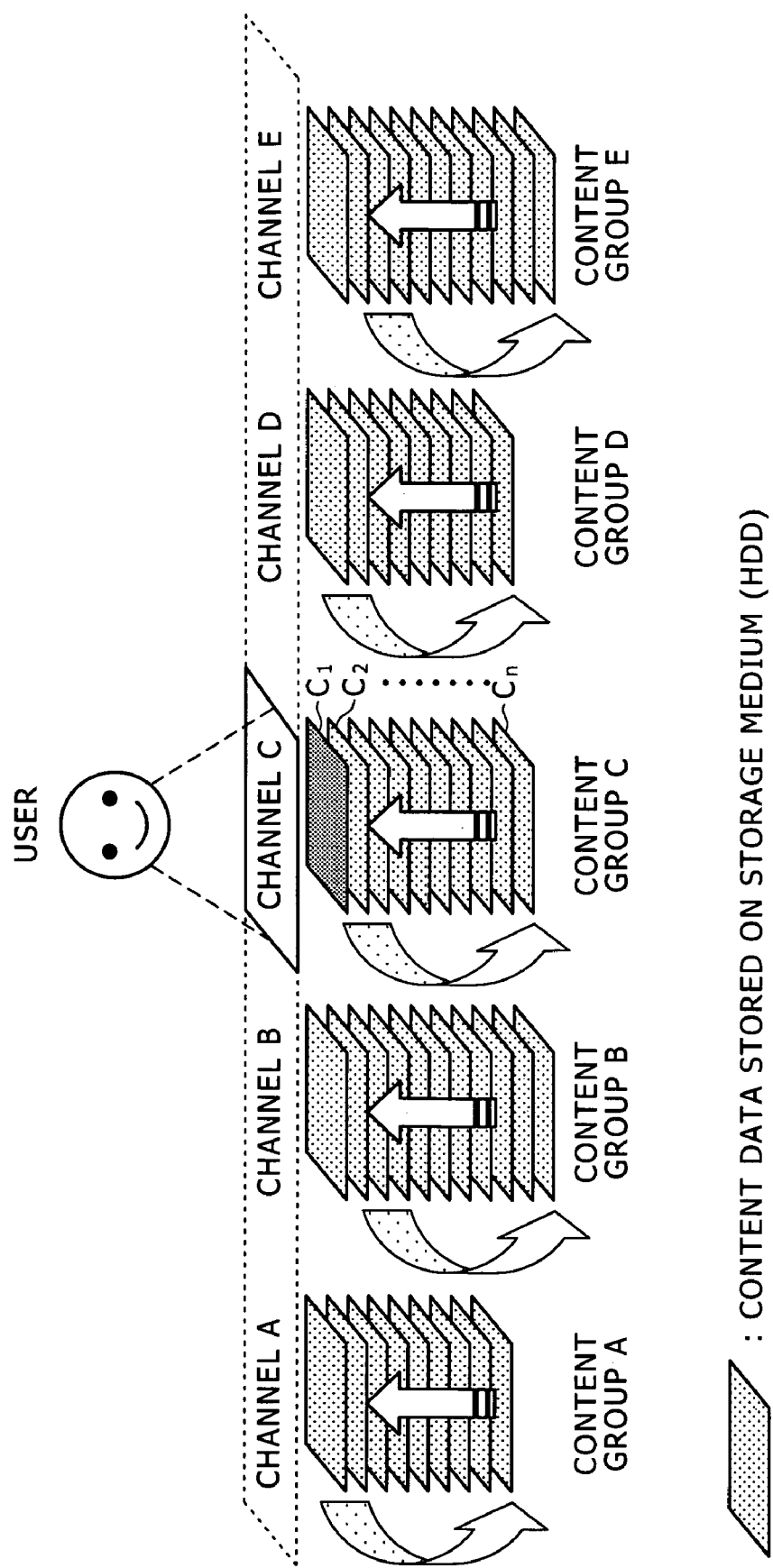
FIG. 1 is a conceptual view outlining a reproduction controlling method for reproducing contents by use of a reproducing apparatus according to a first embodiment of the present invention.

Preferred embodiments of the present invention will now be described in detail with reference to the accompanying drawings. Throughout the drawings and the descriptions that follow, like or corresponding parts in terms of function and structure will be designated by like reference numerals, and their explanations will be omitted where redundant.

First Embodiment

A reproducing apparatus, a reproduction control method, and a program according to the first embodiment of the present invention will now be described.

<Outline>

Explained first is the reproduction control method for controlling content reproduction in conjunction with the reproducing apparatus of the first embodiment. FIG. 1 is a conceptual view outlining the reproduction controlling method for reproducing contents by use of the inventive reproducing apparatus.

The reproducing apparatus of the first embodiment is implemented by the technique (i.e., user interface) it uses to let the user reproduce and monitor a very large number of content data (simply called contents hereunder) stored on a storage medium such as a hard disk drive (HDD). The technique involves grouping the numerous contents held on the storage medium into a plurality of channels (corresponding to content groups) and letting a plurality of contents belonging to each channel be reproduced continuously as a content stream. When the user's operations change channels, the content streams are changed accordingly and are output for monitoring by the user.

Illustratively, as shown in FIG. 1, a plurality of contents stored on the storage medium of the reproducing apparatus are grouped into five content groups A through E. The contents are grouped by the user's own criterion, by content attribute information, by content monitoring frequency or otherwise, as will be discussed later in more detail.

A plurality of contents belonging to each of the content groups A through E are arranged in a predetermined sequence and are handled collectively as a single content stream. The contents in each of the content groups A through E are either reproduced continuously as a content stream or managed as if they were reproduced consecutively. For example, at the end of reproduction of the first content C1 in the content group C, the next content C2 starts being reproduced immediately. Likewise the remaining contents in the content group C are reproduced in a sequentially continuous manner. Upon completion of reproduction of the last content Cn in the content group C, the first content C1 is reached again and the continuous reproduction of the group C is resumed.

The content groups A through E are assigned channels A through E respectively. When the user selects any desired channel, the contents in the content group corresponding to the selected channel are reproduced and output continuously for monitoring by the user. In the example of FIG. 1, the content channel C is seen selected by the user who is shown monitoring the contents belonging to the content group C.

Whereas the content streams of the content groups A through E are either reproduced in parallel or are managed as if they were reproduced parallelly, what actually comes out of the reproducing apparatus as reproduced data (i.e., video output on a monitor or audio output from speakers) for utilization by the user is solely the content stream on the single channel (content group) currently selected by the user.

When huge numbers of contents on the storage medium are reproduced under the above-described control scheme, the user gets the impression that the content streams from all content groups (all channels) are continuously reproduced in parallel. The changeover between contents feels like "zapping"; it is similar to changing TV channels, the user having only to change the channels A through E for a preferred content stream to be reproduced while browsing the numerous contents on the storage medium.

The contents may be of any kind: audio contents such as pieces of music, lectures, and radio programs; video contents including movies, TV programs, video programs, photos, paintings, still images like graphic or tabular representations, or moving pictures; electronic books (E-books), video games, or software. The ensuing descriptions focus on audio contents, in particular on music contents delivered by distribution servers and on tunes ripped from music CDs. However, these are only examples and are not limitative of the contents envisaged by the present invention.

<Structure of the Reproducing Apparatus>

The reproducing apparatus as the first embodiment of the present invention will now be described in more detail.

The inventive reproducing apparatus is an apparatus capable of reproducing contents from a storage medium. Illustratively, the apparatus may be a portable player (see FIG. 2) incorporating a hard disk drive (HDD) as the storage medium.

However, the reproducing apparatus is not limited to such HDD-equipped portable players. Any suitable electronic appliances may be utilized, including various reproducing apparatuses capable of reproducing video/audio data such as HDD players or memory players, computing equipment such as personal computers (laptop as well as desktop types), PDA (personal digital assistants), home-use video game consoles, home information appliances, car audio equipment, car navigation systems, mobile phones, or PHS (personal handyphone systems).

The reproducing apparatus need not be a single, integral apparatus: it can be made up of a plurality of units. For example, the reproducing apparatus may be formed by interconnecting a storage unit that stores contents with a player that reproduces contents (more specifically, the combination of a HDD recorder with a player, the combination of a storage server with a portable player, etc.). In such setups, the configured units may be connected wirelessly or in wired fashion (e.g., using USB (Universal Serial Bus) cables). The connections may also be accomplished using a LAN (local area network) in the household, over the Internet, or through the use of public networks including satellite communication links.

The storage medium on which contents are stored is not limited to the HDD. Alternatively the storage medium may be a magnetic disk, an optical disk, a semiconductor memory, or some other suitable storage medium. The storage medium may be incorporated in the reproducing apparatus or may be attached to it externally. In another example, the storage medium may be a removable medium from which contents can be retrieved by the reproducing apparatus.

Figure 2:
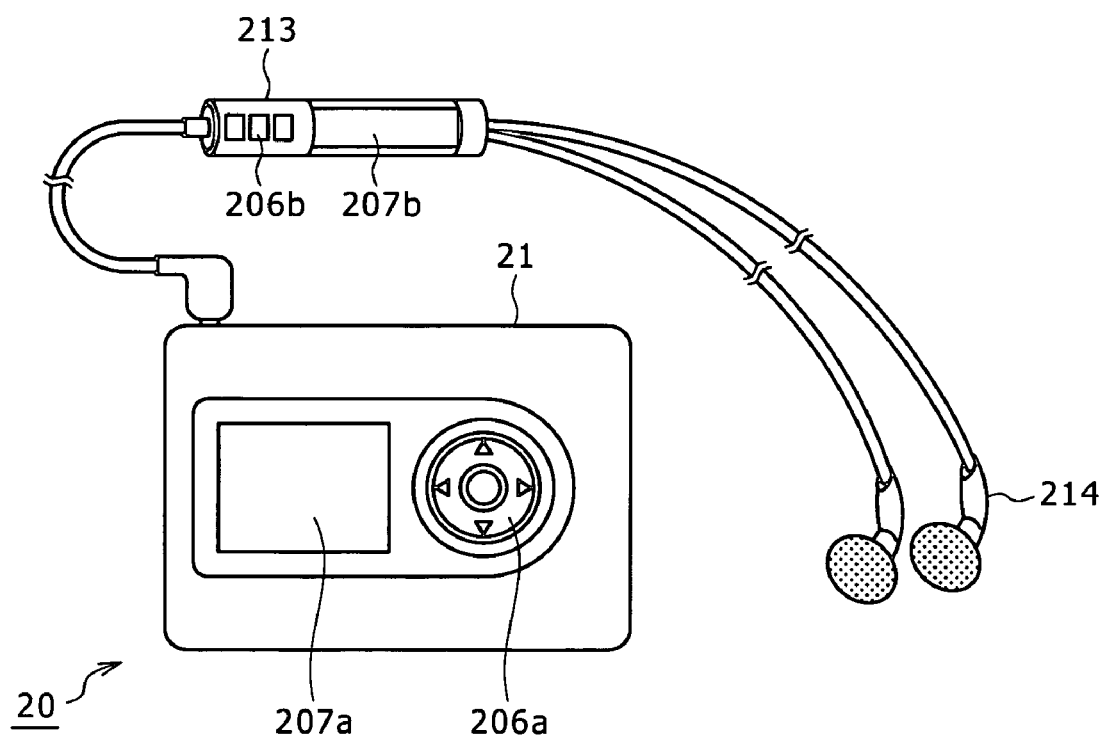
FIG. 2 is a plan view showing an external structure of a HDD-equipped audio player as a typical reproducing apparatus according to the first embodiment.

An external structure of a reproducing apparatus 20 of the first embodiment according to the invention will now be described with reference to FIG. 2. FIG. 2 is a plan view showing an external structure of a HDD-equipped audio player as the inventive reproducing apparatus 20.

As shown in FIG. 2, the reproducing apparatus 20 as a HDD-equipped audio player is a portable device (PD) whose enclosure 21 is small enough for the user to carry around easily. The enclosure 21 incorporates a HDD and a reproduction section (not shown). On the surface of the enclosure 21 are main operation buttons 206a and a main display panel 207a. The main operation buttons 206a are operated by the user to control the reproducing apparatus 20. The main display panel 207a displays information about contents as well as operation status of the reproducing apparatus 20. A connection terminal furnished on an edge of the enclosure 21 connects illustratively to headphones 214 equipped with a remote controller 213. The remote controller 213 is provided with sub-operation buttons 206b and a sub-display panel 207b. The sub-operation buttons 206b are manipulated by the user to control the reproducing apparatus 20. The sub-display panel 207b displays information about contents as well as operation status of the reproducing apparatus 20.

With the reproducing apparatus 20 in hand, the user selects content groups (i.e., changes channels) by operating the operation buttons 206a or 206b while viewing information appearing on the display panel 207a or 207b. Thus operated, the apparatus 20 allows the user to monitor a plurality of music contents stored on the HDD. In such a case, the content groups are selected by simple operations of the operation buttons 206a or 206b. With no need to select individual contents, the user can quickly and simply change the numerous contents on the HDD for passive browsing.

Figure 3:
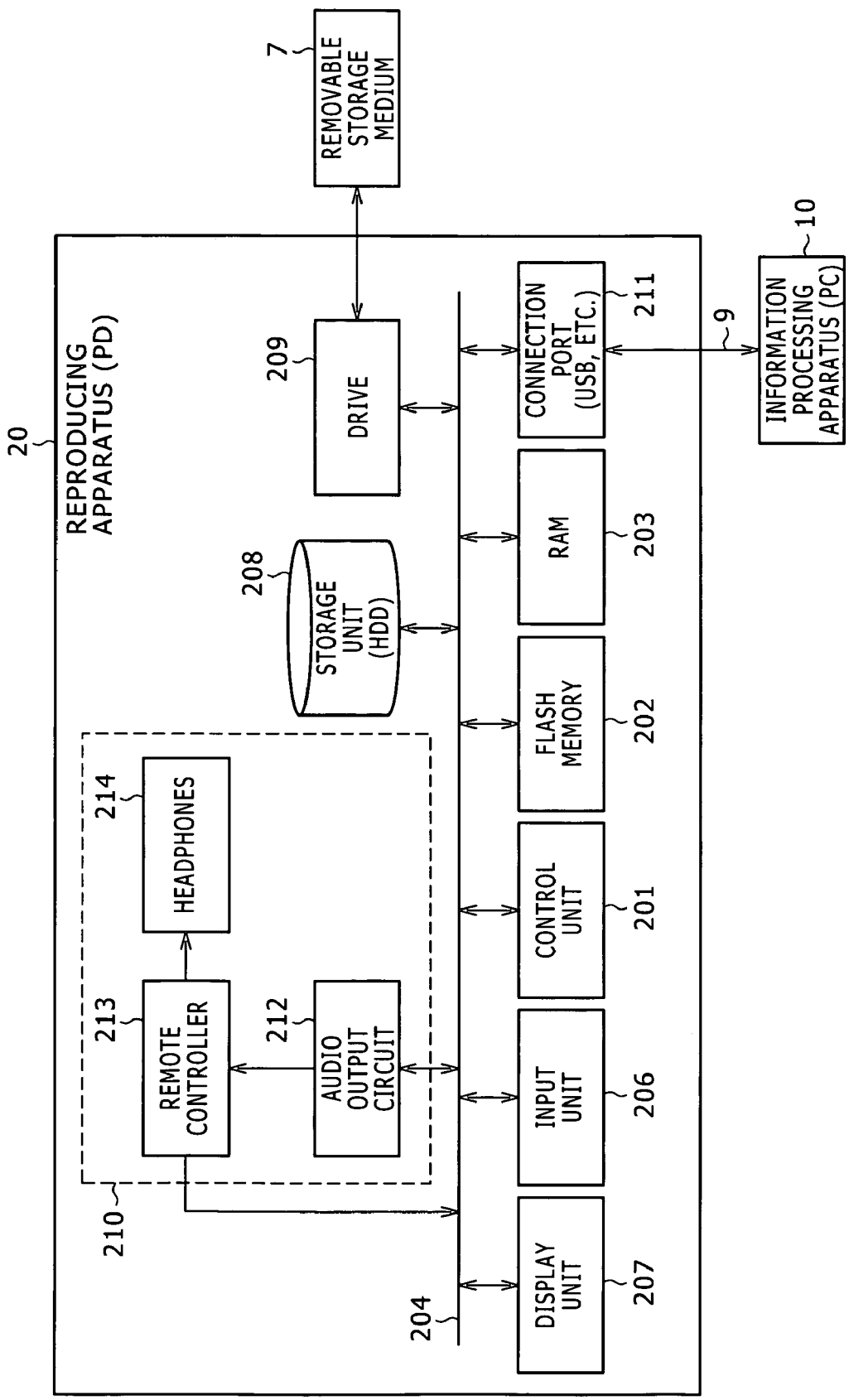
FIG. 3 is a block diagram showing a hardware structure of the HDD-equipped audio player.

A hardware structure of the reproducing apparatus 20 as the first embodiment of the present invention will now be described with reference to FIG. 3. FIG. 3 is a block diagram showing a typical hardware structure of the HDD-equipped audio player practiced as the inventive reproducing apparatus 20.

As shown in FIG. 3, the reproducing apparatus 20 illustratively has a control unit 201, a flash memory 202, a RAM 203, a bus 204, an input unit 206, a display unit 207, a storage unit (HDD) 208, a drive 209, a connection port 211, an audio output circuit 212, a remote controller 213, and headphones 214.

The control unit 201 is typically a micro controller that controls the components of the reproducing apparatus 20. The flash memory 202 illustratively accommodates programs for controlling the performance of the control unit 201 as well as diverse data. The RAM 203 is typically constituted by an SDRAM (synchronous DRAM) that temporarily stores the data to be used by the control unit 201 during its processing.

The bus 204 is a data line that interconnects the control unit 201, flash memory 202, RAM 203, input unit 206, display unit 207, storage unit (HDD) 208, drive 209, connection port 211, and audio output circuit 212.

The input unit 206 and remote controller 213 are constituted illustratively by the above-described operation buttons 206a and 206b in FIG. 2, a touch panel, button keys, levers, dials and other controls, as well as by an input control circuit. The input control circuit generates user input signals reflecting the user's operations performed on these controls and outputs the generated signals to the control unit 201. By controlling the input unit 206 or remote controller 213, the user can input various data to the reproducing apparatus 20 or instruct the apparatus 20 to carry out diverse processing steps.

The display unit 207 is typically formed by an LCD panel and an LCD control circuit and includes the above-described main display panel 207a and sub-display panel 207b. Under control of the control unit 201, the display unit 207 displays in text or image format diverse kinds of information, such as a list of selectable content groups (channels), the title and reproduction time of the currently reproduced content, and operation status of the reproducing apparatus 20.

The storage unit 208 is a typical data storage unit furnished to the reproducing apparatus 20. The storage unit 208 is constituted illustratively by a mass storage HDD (e.g., of tens of GB) that stores a very large number of contents (e.g., thousands or tens of thousands of music contents), programs for use by the control unit 201, and diverse data including processing data.

The drive 209 is a reader/writer for use by a removable storage medium 7. In operation, the drive 209 writes or reads various data such as contents and programs to or from the removable storage medium 7 such as a magnetic disk, an optical disk, a magneto-optical disk, or a semiconductor memory loaded into the reproducing apparatus 20. When equipped with the drive 209, the reproducing apparatus 20 can read and reproduce contents from the removable storage medium 7. However, it is not mandatory to install the drive 209.

The connection port 211 constitutes a connection section that connects the reproducing apparatus 20 to an external device such as an information processing apparatus (PC) 10. Typically, the connection port 211 is formed by a communication controller such as a USB controller and a connection terminal such as a USB terminal. When the reproducing apparatus 20 is connected by the connection port 211 to the information processing apparatus 10 via a local line 9 such as a USB cable, the reproducing apparatus 20 may send and receive contents and diverse data including content attribute information (e.g., titles, artist names and reproduction times of contents) and control signals to and from the information processing apparatus 10.

The output unit 210 outputs reproduced contents (e.g., audio output of music contents). As illustrated, the output unit 210 is typically composed of the audio output circuit 212, remote controller 213, and headphones 214.

The audio output circuit 212 amplifies analog audio data subsequent to decoding by a decoder and digital-to-audio conversion by the CPU (to be discussed later), and outputs the amplified data to the remote controller 213. The analog audio data is forwarded from the remote controller 213 to the headphones 214 that provide audio output through internal speakers for monitoring by the user.

Figure 4:
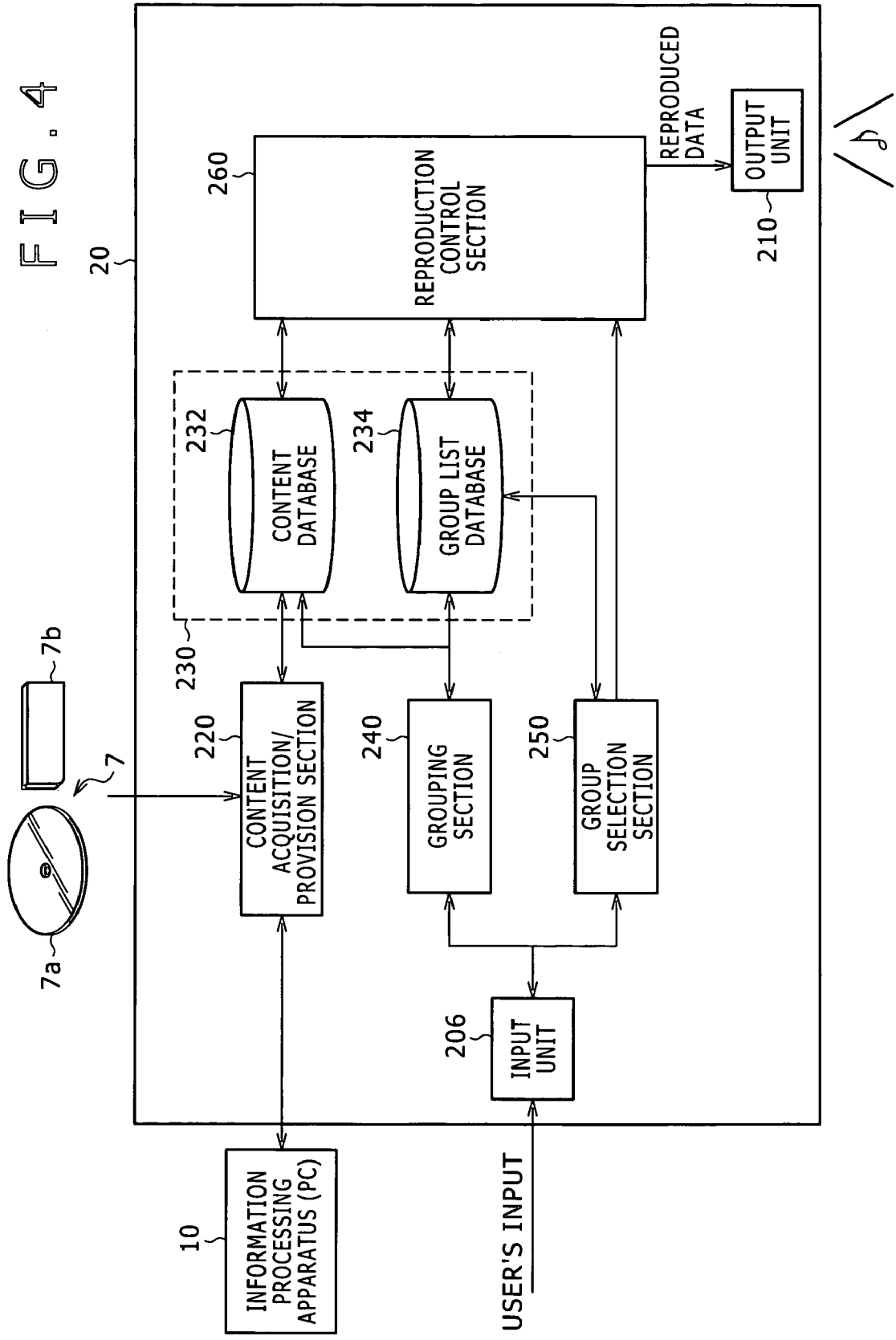
FIG. 4 is a block diagram outlining a functional structure of the reproducing apparatus according to the first embodiment.

A functional structure of the reproducing apparatus 20 according to the present invention will now be described with reference to FIG. 4. FIG. 4 is a block diagram outlining a typical functional structure of the inventive reproducing apparatus 20.

As illustrated in FIG. 4, the reproducing apparatus 20 has a content acquisition/provision section 220, a storage section 230 including a content database 232 and a group list database 234, a grouping section 240, a group selection section 250, and a reproduction control section 260. The storage section 230 is composed illustratively of the above-mentioned storage unit 208, flash memory 202, and/or removable storage medium 7. As such, the storage section 230 constitutes a storage medium arrangement for use by this embodiment of the invention.

The content acquisition/provision section 220 is constituted illustratively by programs for providing and acquiring contents to and from an external device through the use of the drive 209 and connection port 211. More specifically, the content acquisition/provision section 220 sends and receives contents to and from the external device such as the information processing apparatus (PC) 10 or another reproducing apparatus (PD) 20 via the local line 9 or by means of the removable storage medium 7b. Illustratively, the information processing apparatus (PC) 10 may download contents from a content delivery server (not shown) and copy the downloaded contents to the reproducing apparatus 20 for storage therein. If the reproducing apparatus 20 itself is capable of communicating with a content delivery server via the network, the reproducing apparatus 20 may directly download contents from that server.

The content acquisition/provision section 220 may alternatively acquire contents by ripping them from the removable storage medium 7a such as commercially available music CDs or video DVDs, or by self-recording contents. Ripping refers to a process whereby digitally recorded video/audio content data (e.g., PCM data) is extracted from a music CD, a video DVD or some other storage medium and is recorded in computer-processable file format. Self-recording refers to a process whereby images and/or sounds picked up by an imaging/sound collecting device (not shown) as part of the reproducing apparatus 20 are recorded as digital video/audio data.

The contents acquired as described above are recorded to the content database 232 by the content acquisition/provision section 220. If the capacity of the storage unit (HDD) 208 is large enough, the content database 232 can accommodate vast numbers of contents. Since the storage capacity provided for the reproducing apparatus 20 is practically limitless, the user may acquire any and all contents made available in the above-described manner and put them into the content database 232, whether the user intends actually to monitor them later in view of his or her preferences. The content database 232 may thus contain tens of thousands of contents or more. In that case, the user may well find the traditional technique mentioned earlier for individually selecting contents inordinately complicated and tiresome in monitoring the numerous contents in storage, despite the fact that the database will surely include the contents which would satisfy the user's taste if monitored but which are left unchecked.

In order to eliminate such a hold-up, the inventive reproducing apparatus 20 is furnished with the grouping section 240, group selection section 250, and reproduction control section 260, to be discussed later. These components are used to implement a reproduction control technique whereby a very large number of contents are managed as a plurality of content streams to be changed for browsing in much the same way as TV channels are changed, as discussed above in reference to FIG. 1. Each of these components is explained below.

First to be explained is the grouping section 240 that groups a plurality of contents held on the storage unit (HDD) 208 (i.e., a storage medium) into a plurality of content groups. The contents are categorized into groups by the user's own criterion, by content attribute information, by content monitoring frequency, or in random order, as will be discussed later in more detail (see FIGS. 7 through 9).

Illustratively, the grouping section 240 establishes the sequence in which a plurality of contents belonging to each content group are arranged (i.e., ordered for reproduction). The sequence may be established either in accordance with the user's input or automatically by the grouping section 240 (e.g., based on a predetermined criterion or in random order). When the user's input is used as the criterion for establishing the sequence, the contents in each content group may be reproduced and output in the user-designated sequence. If the sequence is determined automatically by the grouping section 240, then the burdens on the user for giving instructions are reduced that much. The grouping section 240 may be arranged to proceed with automatic sequencing without recourse to the user's selection.

The grouping section 240 records to the content group list database 234 group list information indicative of how the plurality of contents have been grouped and sequenced. The group list information is illustratively made up of content identification information and content sequence information. The content identification information identifies the contents belonging to each content group (based on content IDs, content addresses in storage, etc.). The content sequence information denotes the sequence of the contents constituting each content group. Where such group list information is placed in storage, the reproduction control section 260 (to be described later) retrieves the information from the group list database 234 upon reproduction and accordingly determines which contents to be reproduced per content group (channel) and in what sequence they are to be reproduced.

Next to be explained is the group selection section 250. The group selection section 250 serves to select one of the multiple content groups established by the grouping section 240 discussed above.

Illustratively, as described above, the user in content group selection mode may operate the input unit 206 (i.e., operation buttons 206a and 206b in FIG. 2) of the reproducing apparatus 20 so as to select a desired content group (channel) to be reproduced. When thus operated by the user, the input unit 206 inputs a corresponding user input signal to the group selection section 250. In accordance with the user input signal, the group selection section 250 selects the content group in question and outputs to the reproduction control section 260 a group selection signal representative of the selected content group. Illustratively, if the user selectively inputs the content group A during reproduction of the content group C (i.e., upon changeover from channel A to channel B), the group selection section 250 outputs to the reproduction control section 260 a group selection signal denoting the content group A. The group selection section 250 thus instructs the reproduction control section 260 to reproduce and output the content stream of the content group A.

When the reproducing apparatus 20 is started up (i.e., upon power-up), the group selection section 250 may be arranged automatically to select the most recently selected content group and output the corresponding group selection signal to the reproduction control section 260. In content group selection mode, the grouping section 240 may be arranged to display on the display unit 207 a list of selectable content groups based on the group list information retrieved from the group list database 234. A look at the selectable content group list allows the user to select a preferred content group easily.

The reproduction control section 260 will now be described. Upon changeover from one content group to another by the group selection section 260 (i.e., at the time of channel change), the reproduction control section 260 reproduces and outputs the content data corresponding to the point in time which would be reached if a plurality of contents belonging to the selected content group had been reproduced in a sequentially continuous manner starting from a given reproduction starting time.

More specifically, as shown in FIG. 1, the reproduction control section 260 reproduces a plurality of contents belonging to each of the content groups involved on a sequentially continuous basis starting from a given reproduction starting time. In other words, the reproduction control section 260 continuously reproduces the content streams of the content groups in parallel starting from the reproduction starting time. The reproduction starting time illustratively refers to the point in time at which the reproduction control section 260 is started, or to the point in time at which one content group is first selected by the group selection section 250 following start-up of the reproduction control section 260.

From the plurality of content streams, the reproduction control section 260 selectively reproduces only the content stream of the content group selected by the group selection section 250 and outputs the reproduced content data through the output unit 210. Upon selection of a new content group by the group selection section 250, the reproduction control section 260 thus reproduces selectively the contents belonging to the selected content group and outputs the reproduced content data. In this manner, the reproduced data actually output by the output unit 210 is changed from the content stream of the currently selected content group to the content stream of the newly selected content group.

Figure 5:
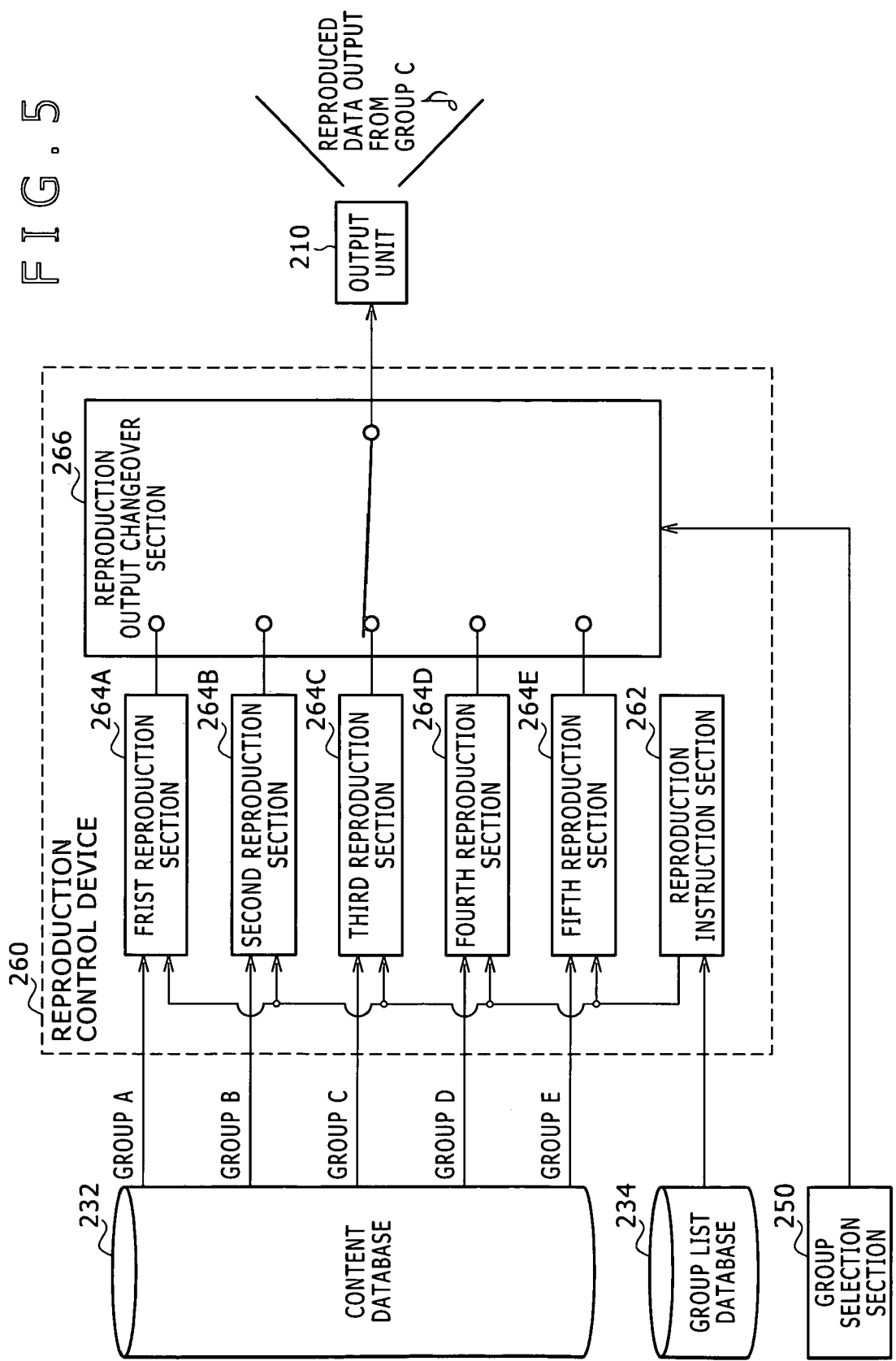
FIG. 5 is a block diagram showing a typical structure of a reproduction control section as part of the first embodiment.

The structure of the reproduction control section 260 of the first embodiment will now be described in more detail with reference to FIG. 5. FIG. 5 is a block diagram showing a detailed structure of the reproduction control section 260 as part of the first embodiment.

As shown in FIG. 5, the reproduction control section 260 adopts a reproduction controlling technique whereby the content streams belonging to the content groups A through E are actually decoded simultaneously for parallel and continuous reproduction so that one of the plurality of reproduced content streams will be selected for output through the output unit 210. This reproduction controlling technique has the advantage of simplifying the process of reproduction control because a plurality of actually reproduced content streams need only be switched for single stream output.

The reproduction controlling technique above is implemented by the reproduction control section 260 of this invention using a reproduction instruction section 262, a first through a fifth reproduction section 264A through 264E (generically called the reproduction section 264 hereunder where appropriate), and a reproduction output changeover section 266. The first through the fifth reproduction sections 264A through 264E are furnished corresponding to the content groups A through E respectively. The reproduction output changeover section 266 outputs the reproduced data by changing from one reproduced content group to another following reproduction by the reproduction sections 264A through 264E.

The reproduction instruction section 262 reads the above-mentioned group list information from the group list database 234. Based on the content identification information and content sequence information included in the group list information, the reproduction instruction section 262 determines the contents to be reproduced per content group (channel) and the sequence in which to reproduce them, and instructs the reproduction sections 264A through 264E to reproduce the contents thus determined.

At least as many reproduction sections 264 as the established content groups are provided. In the example of FIG. 5, the first through the fifth reproduction sections 264A through 264E are furnished corresponding to the five content groups A through E. In operation, the first through the fifth reproduction sections 264A through 264E generate five content streams by reproducing a plurality of contents belonging to each of the content groups A through E, and output the reproduced data as content streams to the reproduction output changeover section 266.

The reproduction process outlined above involves converting content data into a data format in which the data may be output through the output unit 210 (e.g., analog content data), the content data being stored in any of the data formats pursuant to established data compression standards (e.g., ATRAC3 (Adaptive Transform Acoustic Coding 3), ATRAC3 Plus, ATRAC AD, MP3 (MPEG-1 Audio Layer III)). The reproduction process at least includes the decoding of compression-encoded contents. In addition, the reproduction process may include decryption of encrypted contents, processing of data for surround acoustic effects, conversion of data into PCM (Pulse Code Modulation) format, and digital-to-analog conversion.

Figure 6:
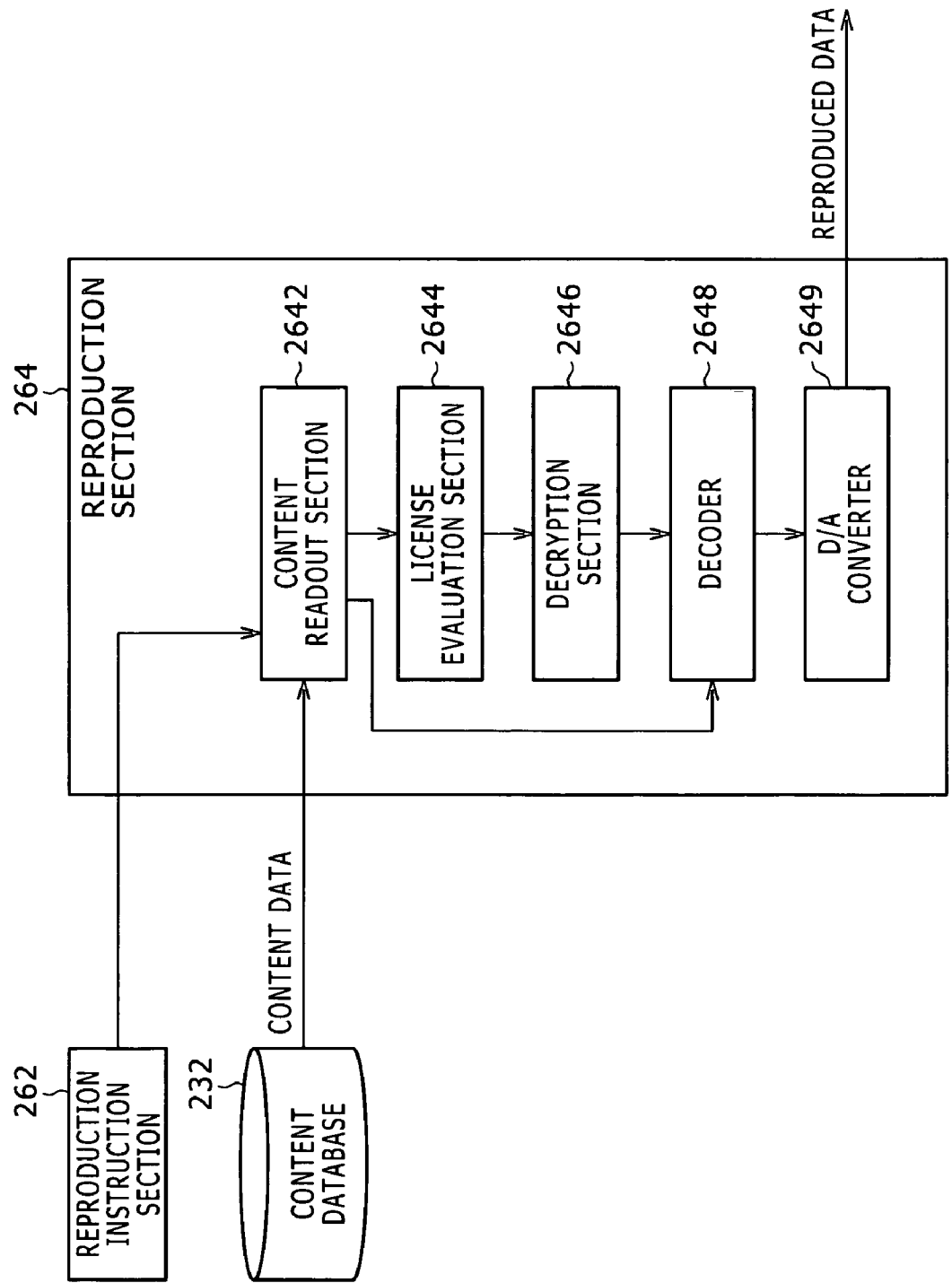
FIG. 6 is a block diagram showing a typical structure of a reproduction section as part of the first embodiment.

How the reproduction section 264 is typically structured will now be described with reference to FIG. 6. FIG. 6 is a block diagram showing a representative structure of the reproduction section 264 as part of the first embodiment.

As shown in FIG. 6, the reproduction section 264 has a content readout section 2642, a license evaluation section 2644, a decryption section 2646, a decoder 2648, and a D/A converter 2649. The content readout section 2642 reads contents from the content database 232 in response to reproduction instructions coming from the reproduction instruction section 262. The license evaluation section 2644 evaluates the licenses attached to contents. The decryption section 2646 decrypts encrypted contents. The decoder 2648 decodes compression-encoded contents. The D/A converter 2649 converts digital data of contents into analog data.

More specifically, the content readout section 2642 reads contents successively from the content database 232 as instructed by the reproduction instruction section 262. The content readout section 2642 may also read from the content database 232 the content attribute information (i.e., titles, artist names, reproduction times and other meta information about contents) stored in association with the contents to be reproduced. The content-associated information thus retrieved may be displayed on the display unit 207 as needed.

The license evaluation section 2644 evaluates the license of each content having been read out by the content readout section 2642, to see if the content in question is allowed to be reproduced. If the content to be reproduced is subject to copyright management under the DRM (Digital Rights Management) scheme and if the reproduction conditions (e.g., allowable reproduction count, reproduction time limit, etc.) specified by the license for the content are not satisfied, then the content in question cannot be reproduced. The license evaluation section 2644 first acquires the license and key information attached to the content to be reproduced. Using the key information, the license evaluation section 2644 decodes the license in order to evaluate the validity of the license. If the license is found to be valid, the license evaluation section 2644 evaluates the reproduction conditions specified by the license to check whether the content can be reproduced. The result of the check is output to the decryption section 2646.

When the license evaluation section 2644 determines that the content in question can be reproduced, the decryption section 2646 decrypts the content in its encrypted format using the key information and outputs the decrypted content to the decoder 2648. If the content to be reproduced is not subject to copyright management (i.e., unencrypted content), the license evaluation section 2644 and decryption section 2646 may be omitted. In such a case, any retrieved content not subject to copyright management may be decoded and reproduced without undergoing license evaluation and decryption.

The decoder 2648 carries out decoding, surround effect processing, conversion to PCM data, or other processes either on the contents read out of the content database 232 by the content readout section 2642, or on the contents subject to copyright management and decrypted by the decryption section 2646. The processed contents are output from the decoder 2648 to the D/A converter 2649.

The D/A converter 2649 converts digital content data (e.g., PCM data) coming from the decoder 2648 into analog content data (i.e., reproduced data) for output. In this embodiment, the D/A converter 2649 outputs the reproduced data resulting from D/A conversion to the reproduction output changeover section 266.

When structured as described above, the reproduction section 264 can convert the contents stored in the content database 232 into a data format in which the data may be output from the output unit 210, the stored contents being in conformity with any one of established data compression standards.

Returning to FIG. 5, the reproduction output changeover section 266 will now be explained. When one content group is selected by the group selection section 250, the reproduction output changeover section 266 selectively outputs the reproduced data that is input from one reproduction section 264 corresponding to the selected content group.

More specifically, the reproduced data from the content groups reproduced by the above-mentioned first through the fifth reproduction sections 264A through 264E are input to the reproduction output changeover section 266. From the multiple reproduced data thus input, the reproduction output changeover section 266 selects the reproduced data corresponding to one content group selected by the group selection section 250 and outputs the selected data to the output unit 210. In the example of FIG. 5, the reproduced data from the content group C is selected and is output acoustically from the output unit 210. In this manner, the reproduction output changeover section 266 outputs reproduced data by changing from one content group to another in accordance with the result of the selection by the group selection section 250.

As described above, the reproduction control section 260 as part of the first embodiment actually reproduces the contents belonging to the content groups A through E in the form of continuous and parallel content streams. One of the content streams is selectively output to the output unit 210 upon content group changeover. That is, the content streams of the multiple content groups A through E are continuously reproduced in a simultaneous, parallel manner. One of the content streams is then selected in response to the user's operation to select a content group (i.e., channel changeover operation), and the reproduced data from the selected content group is actually output for monitoring by the user.

The foregoing has been the detailed description of how the inventive reproducing apparatus 20 is structured with reference to FIGS. 3 through 6. The above-described content acquisition/provision section 220, content database 232, grouping section 240, group selection section 250, and reproduction control section 260 may be constituted either by suitably arranged hardware for handling the processes involved, or by program modules installed in the reproducing apparatus 20 for causing a computer to carry out the processes in question. Illustratively, the reproduction section 264 inside the reproduction control section 260 may be formed either by reproduction circuits capable of reproducing contents, or by content reproduction software installed in the reproducing apparatus 20. As another alternative, of the components making up the reproduction section 264 in FIG. 6, the decoder 2648 and D/A converter 2649 may be constituted by dedicated circuits and the rest by program modules.

<Content Grouping Techniques>

Described below are some techniques for grouping a plurality of contents stored on the storage medium of the reproducing apparatus 20 (e.g., content database 232 on the storage unit (HDD) 208) into a plurality of content groups in accordance with particular grouping standards.

(1) Technique of Establishing Content Groups Based on the User's Selection Input The reproducing apparatus 20 is generally capable of establishing a plurality of play lists each representing a set of contents selected by a certain standard. Given an instruction to reproduce any of such play lists, the reproducing apparatus 20 reproduces the contents included in the play list in a sequentially continuous manner.

From a plurality of contents stored on the storage medium, the user may intentionally select several contents to create a play list or lists. The user-created play lists may be of diverse kinds, such as a play list of contents collected according to the user's preferences (e.g., user A's choice of the 10 best music contents out of those released in April 2005), or a play list of contents selected intentionally by the user for having the same attribute (e.g., singer A's best-hit albums selected according to the user A's preferences).

Corporations and companies distributing contents may create play lists on their own initiative and offer them to users. Illustratively, one company may create a play list of highly popular contents based on recent hit charts; another company may create a play list of little-know contents it specifically recommends.

Figure 7:
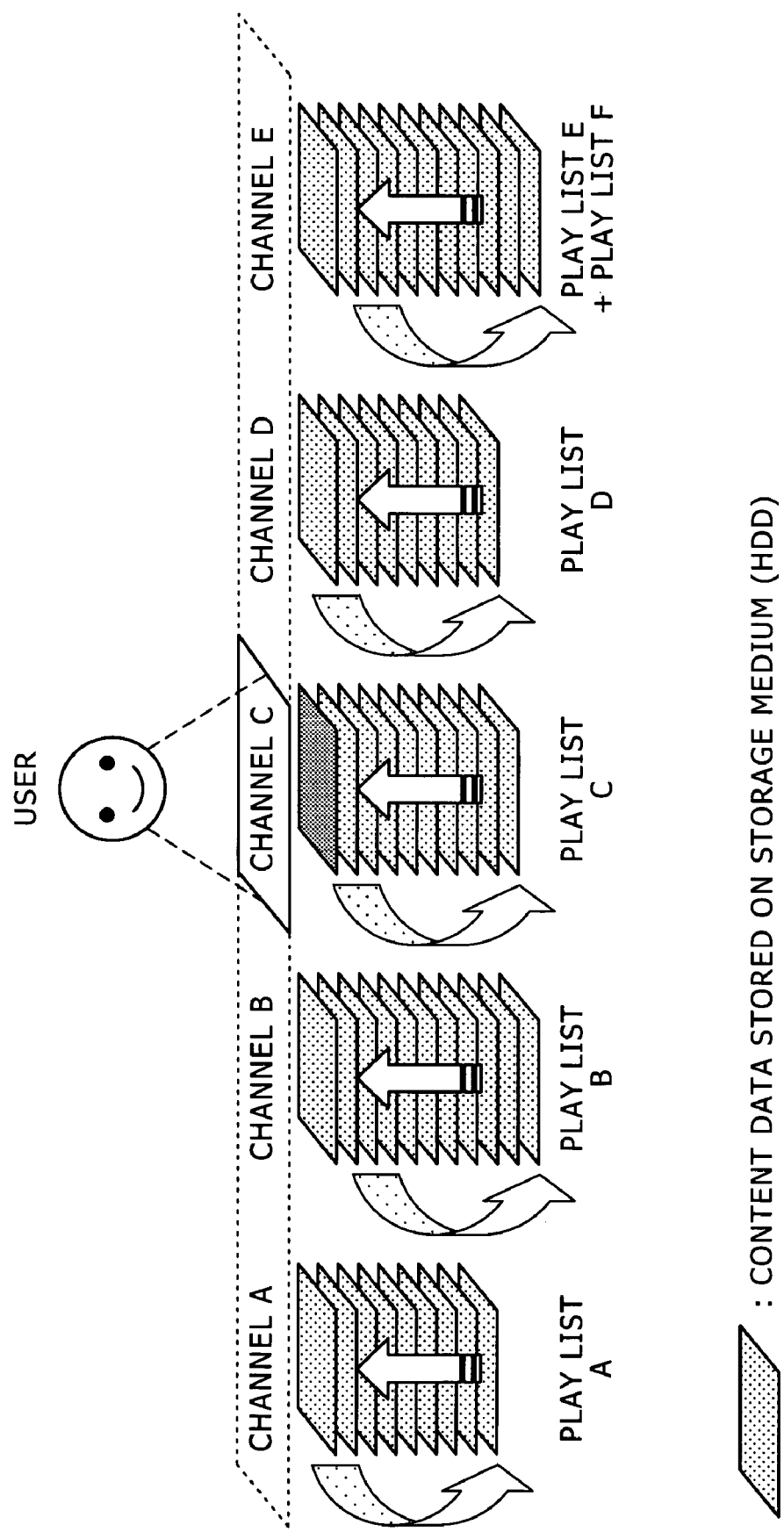
FIG. 7 is a conceptual view showing a scheme of the first embodiment whereby content groups are established on the basis of a user's input of settings (play list)

When a plurality of such play lists are installed in the reproducing apparatus 20, they may each be allotted to a content group. For example, play lists A through F may be allotted to channels A through E as shown in FIG. 7.

A typical technique of play list allotment may involve allotting one play list to each channel. If the number of existing play lists is larger than the number of established channels, then a plurality of play lists may be allotted in combination to one channel so that all play lists may be assigned to all channels. In the example of FIG. 7, the play lists A through D are allotted to the channels A through D respectively, and the play lists E and F are assigned in combination to the channel E. The allotment of play lists to content groups may be carried out by the grouping section 240 either according to the user's selection input or in an automatic manner.

When content groups are established in conjunction with play lists on a one-to-one basis as described above, the user can browse different play lists one after another by simply changing channels. Illustratively, suppose that the user has grown tired of the content stream of the content group A to which the play list A composed of newly released loud contents is allotted. In that case, the user may change from channel A to channel B so as to listen to the content stream of the content group B that is assigned the play list B made up of quieter tunes.

The technique of establishing content groups based on the user's selection input is not limited to utilizing play lists. Alternatively, the user may select individual contents and allot them to a content group or groups. In this case, the user must perform the chores of allotting contents by himself or herself to content groups. However, once the contents have been grouped and the content groups established, there is no more need for the user individually to select the contents to be reproduced.

(2) Technique of Establishing Content Groups Based on Content Attribute Information Described below is the technique of grouping a plurality of contents by content attribute information (i.e., information representative of content attributes) into a plurality of content groups.

Content attributes may illustratively include: artists (singers, songwriters, composers, arrangers, etc., of music contents), genres (pops, jazz, rock, reggae, etc.), BPM (bits per minute: tempo of music contents), times of release (years and months of release), localities of release (U.S., Europe, Japan, etc.), companies releasing contents (companies that create and market contents), and reproduction times of contents.

The content attribute information indicative of such content attributes is stored in the content database 232 or elsewhere in association with corresponding contents. On the basis of the content attribute information, the grouping section 240 may group a plurality of contents held in the content database 232 into a plurality of content groups.

Figure 8:
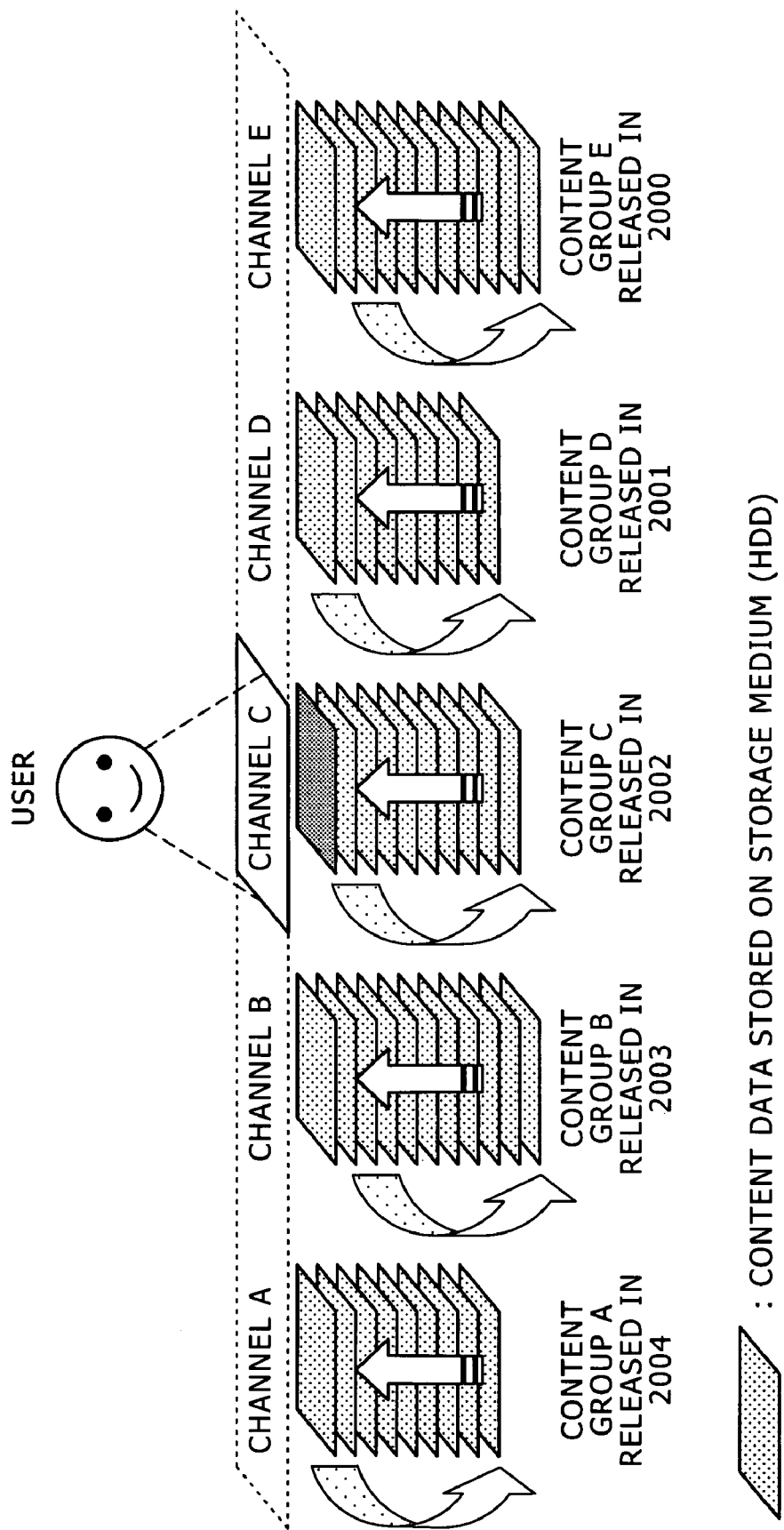
FIG. 8 is a conceptual view showing another scheme of the first embodiment whereby content groups are established on the basis of content attribute information (year of release)

FIG. 8 shows an example in which contents are grouped illustratively into content groups A through E according to the years of content release (2000 through 2005). With these content groups established, the user need only select the channel for a desired year of release when wishing to monitor randomly and successively the contents released in that year. The contents released in another year may be monitored by simply changing channels.

When the contents are grouped according to content attribute as described above, the user can browse the content streams grouped by the attribute of interest by simply changing channels corresponding to the content groups.

(3) Technique of Establishing Content Groups Based on Content Monitoring Frequencies Described below is the technique of grouping a plurality of contents into a plurality of content groups on the basis of content monitoring frequencies (i.e., reproduction frequencies).

The user has his or her own preferences for contents. It follows that a plurality of contents stored in the content database 232 may well have been monitored with different frequencies in the past. Such different frequencies in monitoring contents (e.g., the number of times each content has been monitored, or the length of the period in which each content has not been monitored) can be used to classify the contents into content groups.

Illustratively, the contents of interest may be grouped by the content monitoring count as follows: the number of times each content has been monitored is counted and retained in advance. Upon grouping of the contents, they are divided into a plurality of classes by monitoring count, and the content group of each class is allotted to each channel. At this point, the contents belonging to the class with a high monitoring frequency and the contents belonging to the class with a low monitoring frequency are allotted to the content groups in an evenly distributed manner.

Figure 9:
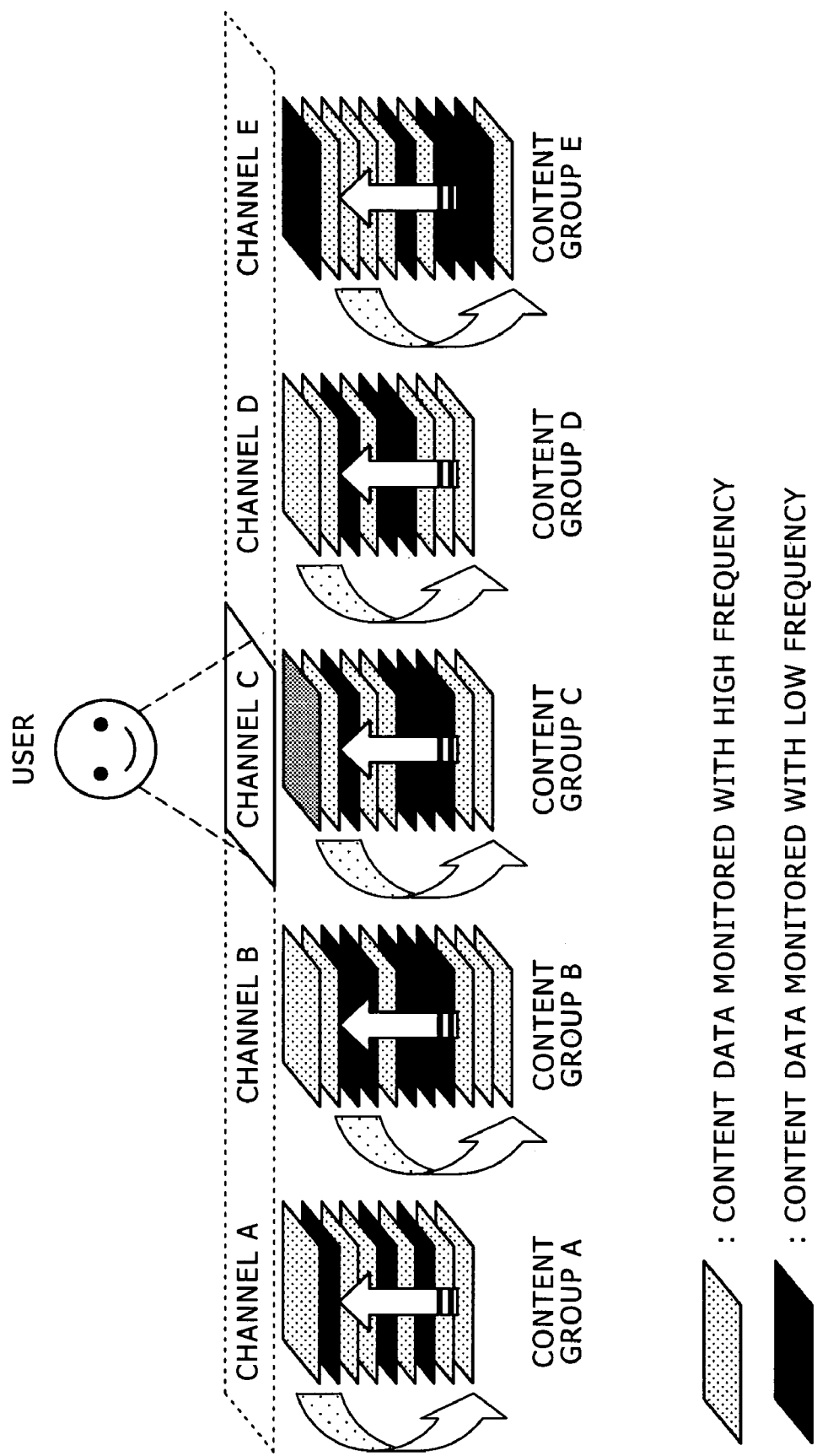
FIG. 9 is a conceptual view showing another scheme of the first embodiment whereby content groups are established on the basis of content monitoring frequency.

FIG. 9 shows an example in which a plurality of contents held in the content database 232 are divided into two classes, one class grouping the contents monitored with a high frequency, the other class collecting the contents monitored with a low frequency. The contents of the two classes are seen randomly allotted to the channels associated with the established content groups.

When the content groups are thus established, each content group has a mixture of frequently and infrequently monitored contents. If the contents in, say, the content group C are reproduced continuously, the contents frequently reproduced in the past are reproduced along with the contents not so frequently reproduced. This gives the user an opportunity to monitor contents that have not been monitored at all or have been monitored only infrequently in the past. As a result, the user may get a serendipitous chance to find contents that satisfy his or her taste. Since the user's preferences change over time, the content groups established as described above and reproduced in streaming fashion provide a high possibility that hitherto-unknown yet interesting contents will capture the user's attention.

Because the contents with high and low monitoring frequencies are arranged in imbricate fashion when grouped, those contents that are not quite to the user's taste will not be reproduced one after another. This helps prevent the user from getting bored with the contents being played.

Naturally, any time the user thinks the content stream being reproduced on the currently selected channel fails to meet his or her preferences, the user can change channels to monitor the content stream of another content group.

When the content groups are established on the basis of content monitoring frequencies as discussed above, the user can browse content streams each having a mixture of frequently and infrequently monitored contents. Whenever the currently monitored content is found uninteresting, the user can simply change channels to browse another content group. This gives the user more opportunities than before to find interesting contents by chance from among a very large number of contents stored in the content database 232.

Where the content streams derived from the above grouping technique are reproduced, the practice also satisfies the user's desire to be offered the chance to enjoy contents in a passive manner, without intentionally selecting and reproducing particular contents.

(4) Technique of Allotting Contents Randomly to Content Groups

This technique involves randomly allotting the contents stored in the content database 232 to as many content groups as the number of available channels (i.e., number of content groups to be established), whereby the content groups are established.

The random allotment of contents to content groups allows the user to browse content streams each having a random mixture of already monitored and yet-to-be-monitored contents. Any time the currently monitored content is found boring, the user can simply change channels to browse another content group. This gives the user more opportunities to discover attractive contents by chance from among a very large number of contents stored in the content database 232.

When the content streams resulting from the above grouping technique are reproduced, it also satisfies the user's wish simply to have the chance to monitor contents in passive fashion, without deliberately selecting and reproducing specific contents.

<Reproduction Controlling Method>

Figure 10:
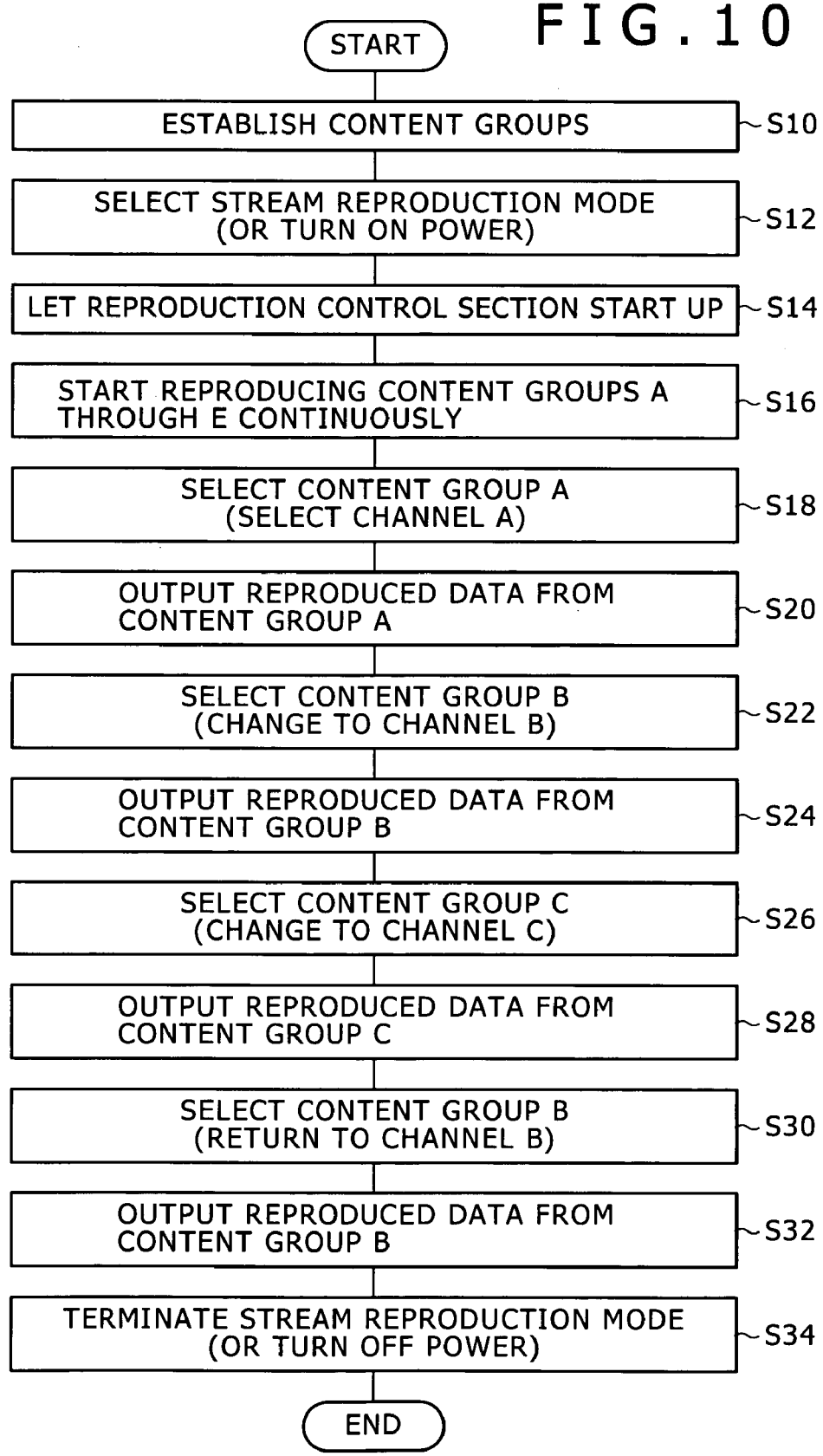
FIG. 10 is a flowchart of steps constituting the reproduction controlling method according to the first embodiment.
Figure 11:
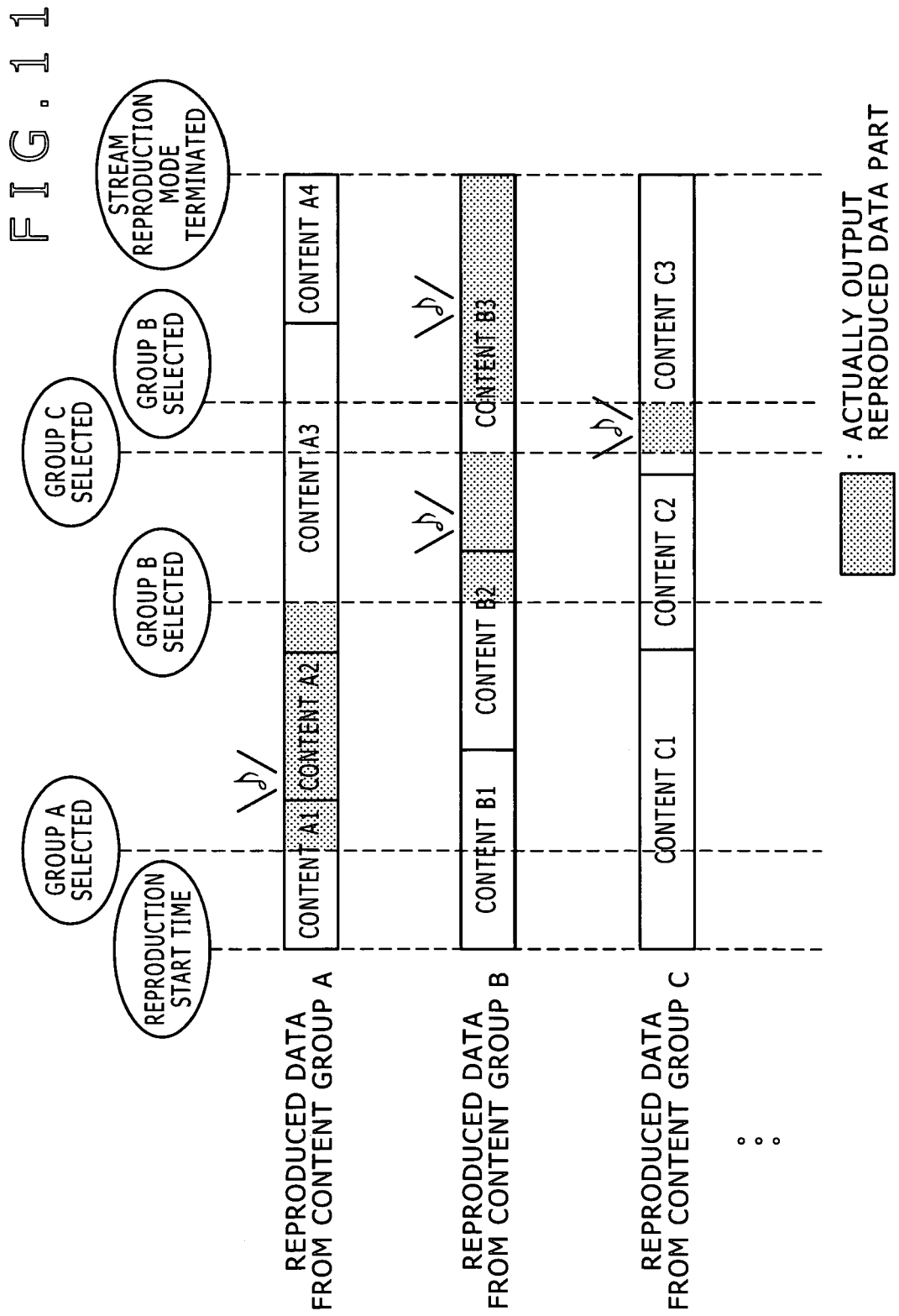
FIG. 11 is a conceptual view showing how contents are typically reproduced by the reproduction controlling method of FIG. 10.

Described below with reference to FIGS. 10 and 11 is the reproduction controlling method as part of the first embodiment through the use of the above-described reproducing apparatus 20. FIG. 10 is a flowchart of steps constituting the reproduction controlling method according to the first embodiment. FIG. 11 is a conceptual view showing how contents are typically reproduced by the reproduction controlling method of FIG. 10.

As shown in FIG. 10, a plurality of content data stored on the storage medium of the reproducing apparatus 20 are grouped in step S10 into a plurality of content groups. More specifically, the above-described grouping section 240 groups the multiple contents held in the content database 232 on the storage unit (HDD) 208 into a plurality of content groups according to any one of the grouping criteria discussed above.

In step S12, stream reproduction mode is selected. The stream reproduction mode, as explained above illustratively with reference to FIG. 1, signifies a reproduction mode in which only one content group selected by the user is reproduced and output where the contents belonging to a plurality of content groups are arranged to be reproduced simultaneously, parallelly and continuously. The reproducing apparatus 20 is structured to have this stream reproduction mode alternated with normal reproduction mode (i.e., a mode in which contents are individually selected and reproduced) as desired. The user may operate the input unit 206 of the reproducing apparatus 20 to select either the normal reproduction mode or the stream reproduction mode. In this step, the stream reproduction mode is selected in place of the normal reproduction mode.

If the stream reproduction mode was being selected before the reproducing apparatus 20 was switched off, then the stream reproduction mode is automatically selected when the reproducing apparatus 20 is again turned on. In the case of a reproducing apparatus incapable of alternating the stream reproduction mode with the normal reproduction mode, the stream reproduction mode is always selected whenever the reproducing apparatus 20 is switched on.

In step S14, the reproduction control section 260 of the reproducing apparatus 20 is started up. Where the stream reproduction mode was selected or the reproducing apparatus 20 was switched on in step S12, then the reproduction control section 20 (explained above illustratively with reference to FIG. 5) is automatically turned on.

In step S16, starting from the point in time at which the reproduction control section 260 is started (i.e., at reproduction starting time), a plurality of contents belonging to each content group start being reproduced. Where the reproduction control section 260 was started in step S14, the reproduction sections 264A through 264E (see FIG. 6) in the reproduction control section 260 start reading out and reproduce the first contents A1, B1, C1, etc., from the content groups A through E respectively. As a result, as shown in FIG. 11, a plurality of reproduced data from the contents A through E in the content groups A through E are output simultaneously starting from the point in time at which the reproduction control section 260 is started.

In step S18, the content group A (channel A) is selected (first group selecting step). More specifically, based on the user's selection input, the group selection section 250 selects one content group A from a plurality of content groups and outputs the result of the selection to the reproduction control section 260. If the content group A was already selected in the most recent execution of the stream reproduction mode, then the group selection section 250 may be arranged to select the content group A automatically, i.e., without the user's selection input.

In step S20, the data reproduced from the content group A is output starting from the point in time at which the content group A is selected (first reproducing step). With the content group A selected in step S18, the output unit 210 outputs the data reproduced from a plurality of contents A1, A2, etc., which belong to the content group A and which are reproduced in sequentially continuous fashion starting from the point in time of the selection of the content group A, as shown in FIG. 11. This allows the user to monitor content streams A1, A2, etc., from the content group A.

In step S22, the content group B is selected in place of the content group A upon changeover from channel A to channel B (second group selecting step). More specifically, the group selection section 250 selects the content group B in place of the currently reproduced content group A based on the user's selection input and outputs the result of the selection to the reproduction control section 260.

In step S24, the data reproduced from the content group B is output starting from the point in time at which the content group B is selected (second reproducing step). With the content group B selected in step S22, the output unit 210 outputs the data reproduced from the content B2 corresponding to, and starting from, the point in time at which the content group B is selected from among a plurality of contents B1, B2, etc., which belong to the content group B and which are reproduced in sequentially continuous fashion, as shown in FIG. 11. In this case, what is output is the reproduced data from the content B2 subsequent to the point in time of the group selection. This allows the user to monitor content streams B2, B3, etc., from the content group B.

In step S26, the content group C is selected in place of the content group B upon changeover from channel B to channel C (third group selecting step). More specifically, the group selection section 250 selects the content group C in place of the currently reproduced content group B based on the user's selection input and outputs the result of the selection to the reproduction control section 260. This type of channel changeover operation is typically performed when the user currently monitoring the content B3 wants to browse some other content.

In step S28, the data reproduced from the content group C is output starting from the point in time at which the content group C is selected (third reproducing step). With the content group C selected in step S26, the output unit 210 outputs the data reproduced from the content C3 corresponding to, and starting from, the point in time at which the content group C is selected from among the plurality of contents C1, C2, etc., which belong to the content group C and which are reproduced in sequentially continuous fashion, as shown in FIG. 11. In this case, what is output is the reproduced data from the content C3 subsequent to the point in time of the group selection. This allows the user to monitor content streams C3, etc., from the content group C.

In step S30, the content group B is again selected in place of the content group C upon changeover from channel C back to channel B (fourth group selecting step). More specifically, the group selection section 250 again selects the content group B in place of the currently reproduced content group C based on the user's selection input and outputs the result of the selection to the reproduction control section 260. This type of channel changeover operation is typically performed when the user having checked the content C3 for a while again wants to monitor the content B3 that is more to his or her taste.

In step S32, the data reproduced from the content group B is output starting from the point in time at which the content group B is again selected (fourth reproducing step). With the content group B reselected in step S28, the output unit 210 outputs the data reproduced from the content B3 corresponding to, and starting from, the point in time at which the content group B is again selected from among the plurality of contents B1, B2, etc., which belong to the content group B and which are reproduced in sequentially continuous fashion, as shown in FIG. 11. In this case, what is output is the reproduced data from the content B3 subsequent to the point in time of the group selection. This allows the user to again monitor the content streams B3, etc., from the previously monitored content group B which is reached again upon changeover from channel C back to channel B.

According to the inventive reproduction controlling method, as described above, the user may again monitor the contents on the previously selected channel if that channel is again reached soon after changeover to the other channel.

This is a significant difference from the traditional "shuffle reproduction" method whereby no such effects are provided in the stream reproduction mode.

In step S34, the stream reproduction mode is brought to an end. Illustratively, the stream reproduction mode is terminated when the user selects the normal reproduction mode in place of the stream reproduction mode or when the reproducing apparatus 20 is switched off. At this point, the reproduction sections 264A through 264E in the reproduction control section 260 stop their reproducing operations and terminate reproduction of data from all content groups A through E, as shown in FIG. 11.

The foregoing has been the explanation of the reproducing apparatus 20 and reproduction controlling method according to the first embodiment of the present invention. Where the inventive reproducing apparatus 20 and reproduction controlling method are in place, the multiple reproduction sections 264A through 264E are used in conjunction with the reproduction output changeover section 266 to generate a plurality of reproduced data streams from all content groups derived from a plurality of contents stored on the storage medium, the contents of each content group being actually reproduced simultaneously, parallelly and continuously. Only the reproduced data from one selected content group is output from the output unit 210. The process of reproduction control is thus simplified because a plurality of actually reproduced data streams is simply switched over for output of a single data stream. This reproduction controlling method is particularly advantageous if the throughput of the control unit 201 furnished in the reproducing apparatus 20 is high and if the storage capacity of the RAM 203 or other similar devices is appreciably large.

Second Embodiment

A reproducing apparatus 20, a reproduction control method, and a program according to the second embodiment of the present invention will now be described. Compared with its counterpart of the first embodiment, the reproducing apparatus 20 of the second embodiment has a differently structured reproduction control section 260. The major difference is that not all content groups are actually reproduced but the contents of only the selected content group are reproduced and output in reality; the rest of the content groups are reproduced in simulated fashion. Except for that difference in functionality, the reproducing apparatus 20 of the second embodiment is substantially the same in functional structure as its counterpart of the first embodiment and thus will not be described further in detail.

<Outline>

Figure 12:
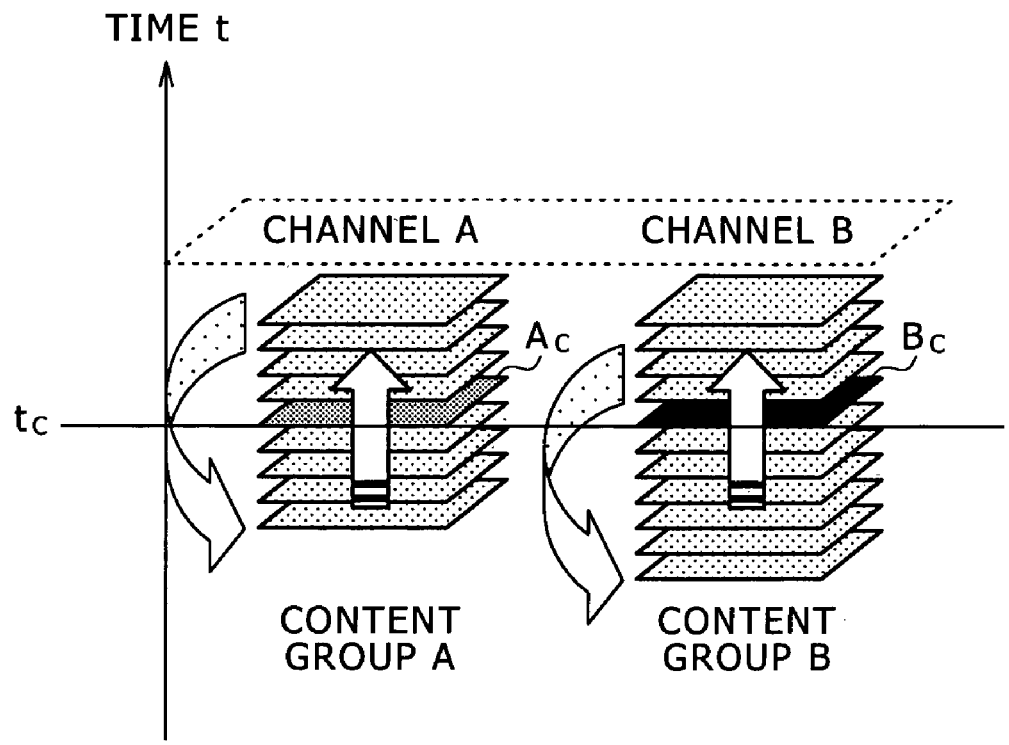
FIG. 12 is a conceptual view outlining a reproduction controlling method for reproducing contents by use of a reproducing apparatus according to a second embodiment of the present invention.

What follows is an overview, in reference to FIG. 12, of the reproduction controlling method for use with the reproducing apparatus 20 according to the second embodiment of the present invention. FIG. 12 is a conceptual view outlining the controlling method for reproducing contents through the use of the inventive reproducing apparatus 20.

This reproduction controlling method involves managing the contents belonging to all content groups as if they were apparently reproduced continuously as a content stream of each content group while causing the contents of only one content group to be actually reproduced and output. The content streams of all content groups are merely subject to time management. Upon changeover from one content group to another, that content in the content stream of the newly selected content group which corresponds to the point in time of the selection is identified instantaneously before being reproduced and output.

That is, the elapsed time of every content stream starting from a given reproduction starting time is placed under a time management scheme. When a new content group is selected (i.e., upon channel changeover), the reproducing apparatus is made to determine, based on the elapsed time counted since the reproduction starting time and on reproduction time information about each content, the content data which belongs to the selected content group and which corresponds to that point in time which would be reached upon content group selection if a plurality of content data belonging to the selected content group had been reproduced in a sequentially continuous manner starting from the reproduction starting time. Of the contents included in the selected content group, those including and subsequent to the content determined as described above are reproduced as they are arranged (i.e., in sequentially continuous fashion) and output from the output unit 210.

Below is a more detailed explanation of the reproduction controlling method above with reference to FIG. 12. FIG. 12 shows a state in which a changeover from content group A to content group B occurs (i.e., channel A is replaced by channel B) at a time tc. Before the changeover to the content group B (i.e., prior to the time tc), the reproduction control section 260 of the reproducing apparatus 20 was reproducing and outputting a content Ac of the content group A. At the time tc at which the changeover from content group A to content group B takes place, the reproducing apparatus 20 instantaneously reads from the content database 232 a content Bc in the content stream of the newly selected content group B, and decodes and outputs the retrieved content Bc which corresponds to the time tc of the changeover.

Described below is a typical structure of the reproducing apparatus 20 for use in implementing the inventive reproduction controlling method above. Also provided is an explanation of a typical flow of steps constituting the reproduction controlling method.

<Structure of the Reproduction Control Section>

Figure 13:
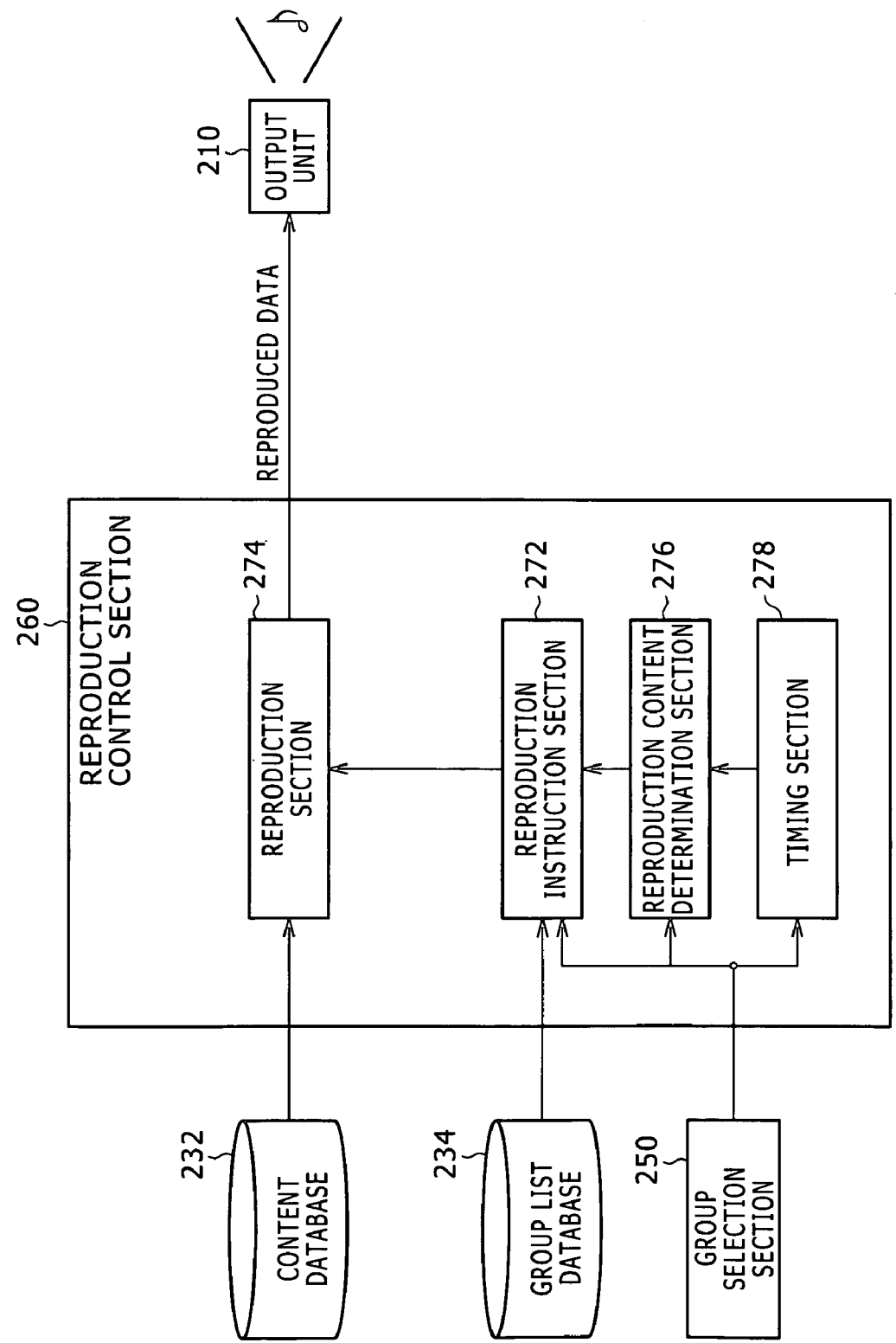
FIG. 13 is a block diagram showing a typical structure of a reproduction control section as part of the second embodiment.

Described first with reference to FIG. 13 is a detailed structure of the reproduction control section 260 according to the second embodiment of the present invention. FIG. 13 is a block diagram showing a typical structure of the reproduction control section 260 as part of the second embodiment. This reproduction control section 260 is a component that corresponds to another reproduction control section 260 described earlier with reference to FIG. 4.

As shown in FIG. 13, the reproduction control section 260 has a reproduction instruction section 272, a reproduction section 274, a reproduction content determination section 276, and a timing section 278. The reproduction section 274 is provided as a single section for dealing with all content groups A through E. The reproduction content determination section 276 determines the content to be reproduced upon changeover from one content group to another. The timing section 278 detects an elapsed time since a given reproduction starting time.

The reproduction instruction section 272 instructs the reproduction section 274 to reproduce in sequentially continuous fashion the contents from the content group selected by the group selection section 250. More specifically, the reproduction instruction section 272 determines the content group corresponding to a group selection signal sent from the group selection section 250, and reads group list information from the group list database 234. On the basis of content identification information and content sequence information included in the group list information regarding the determined content group, the reproduction instruction section 272 identifies the contents to be reproduced from the determined content group (channel) and the sequence in which to reproduce the contents in question, and notifies the reproduction section 274 of the target contents to be reproduced. When a new content group is selected, the reproduction instruction section 272 instructs the reproduction section 274 to reproduce the content designated by the reproduction content determination section 276 starting from a given reproduction starting position, as will be discussed later.

The reproduction section 274 generates a content stream by reproducing in sequentially continuous fashion a plurality of contents belonging to the content group specified by the reproduction instruction section 272. The reproduced data from the content stream is output from the reproduction section 274 to the output unit 210. The detailed functional structure of the reproduction section 274 is substantially the same as the functional structure described above with reference to FIG. 6 and thus will not be described further.

The reproduction content determination section 276 manages the elapsed time since the reproduction starting time through the use of the timing section 278. When a new content group is selected at the time tc by the group selection section 250, the reproduction content determination section 276 determines, based on the elapsed time and on reproduction time information regarding each content, the content data which belongs to the selected content group and which corresponds to that point in time which would be reached upon content group selection if a plurality of content data belonging to the selected content group had been reproduced in a sequentially continuous manner starting from the reproduction starting time. Furthermore, the reproduction content determination section 276 determines the reproduction starting position of the content designated as described above (e.g., the position of the frame corresponding to the point in time of the selection).

A specific example of the process for determining the content is explained below. Illustratively, if codec information attached to each content includes such information as the length of frames constituting the content in question and frame-by-frame second count, then the reproduction content determination section 276 performs calculations based on that information in order to identify the content corresponding to the point in time of the content group selection and determine the reproduction starting position in the identified content. If there exists a stored table of relations between sample frames and their reproduction times, the reproduction content determination section 276 performs calculations based on that table and on the elapsed time so as to identify the content corresponding to the point in time of the content group selection and determine the reproduction starting position in the identified content. Allowing for a delay upon content changeover, the reproduction content determination section 276 may correct the reproduction starting position to a position corresponding to a point in time a little later than the exact time of the selection.

The reproduction content determination section 276 gives the reproduction instruction section 272 the content thus identified and the production starting position in the identified content.

The foregoing has been the explanation of the typical structure of the reproduction control section 260 as part of the second embodiment. The reproduction instruction section 272, reproduction section 274, reproduction content determination section 276, and timing section 278 described above may be constituted either by suitably arranged hardware for handling the processes involved, or by program modules installed in the reproducing apparatus 20 for causing a computer to carry out the processes in question.

<Reproduction Controlling Method>

Figure 14:
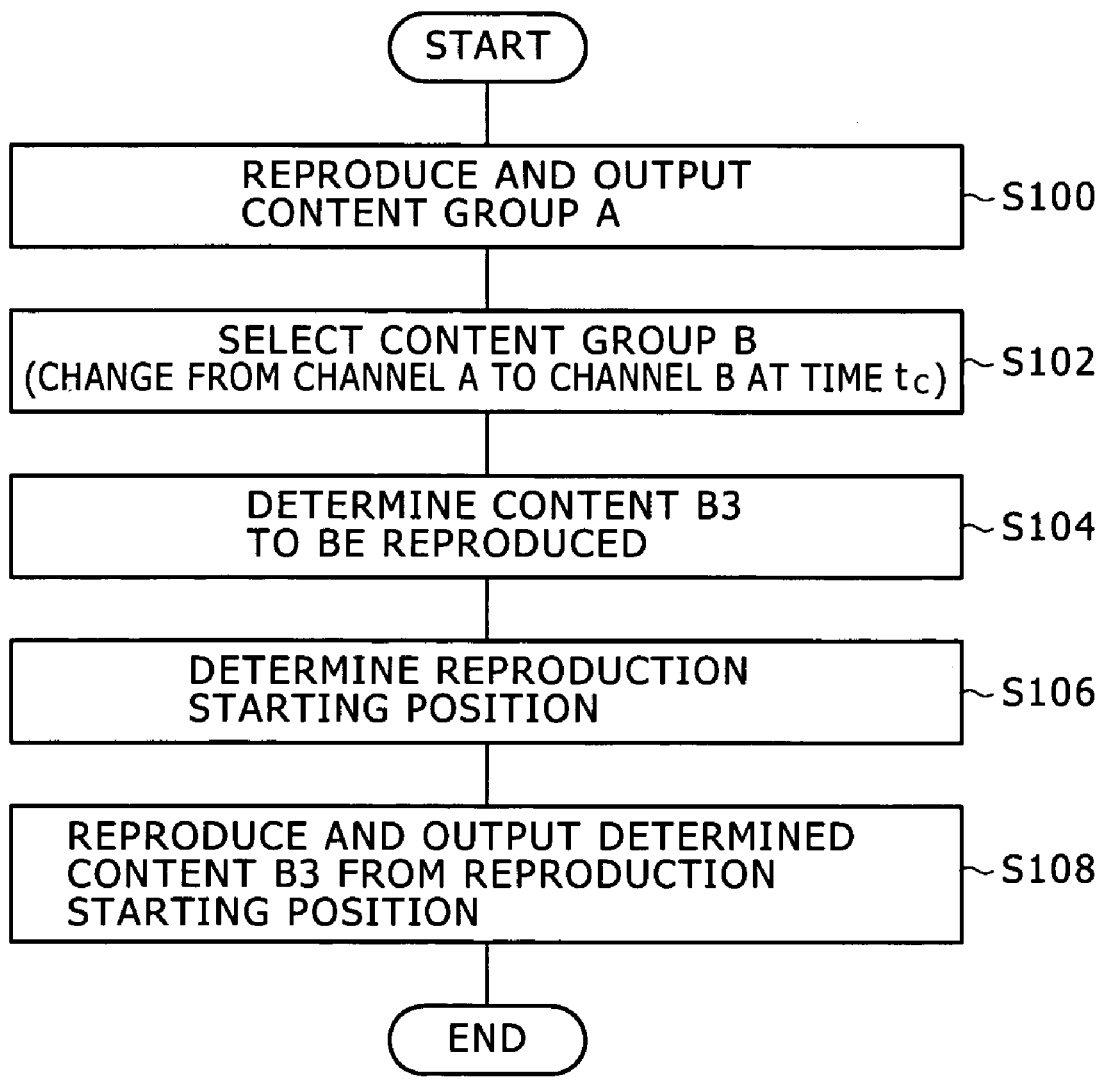
FIG. 14 is a flowchart of steps carried out by the reproduction controlling method of the second embodiment before and after selecting a changeover from one content group to another.
Figure 15:
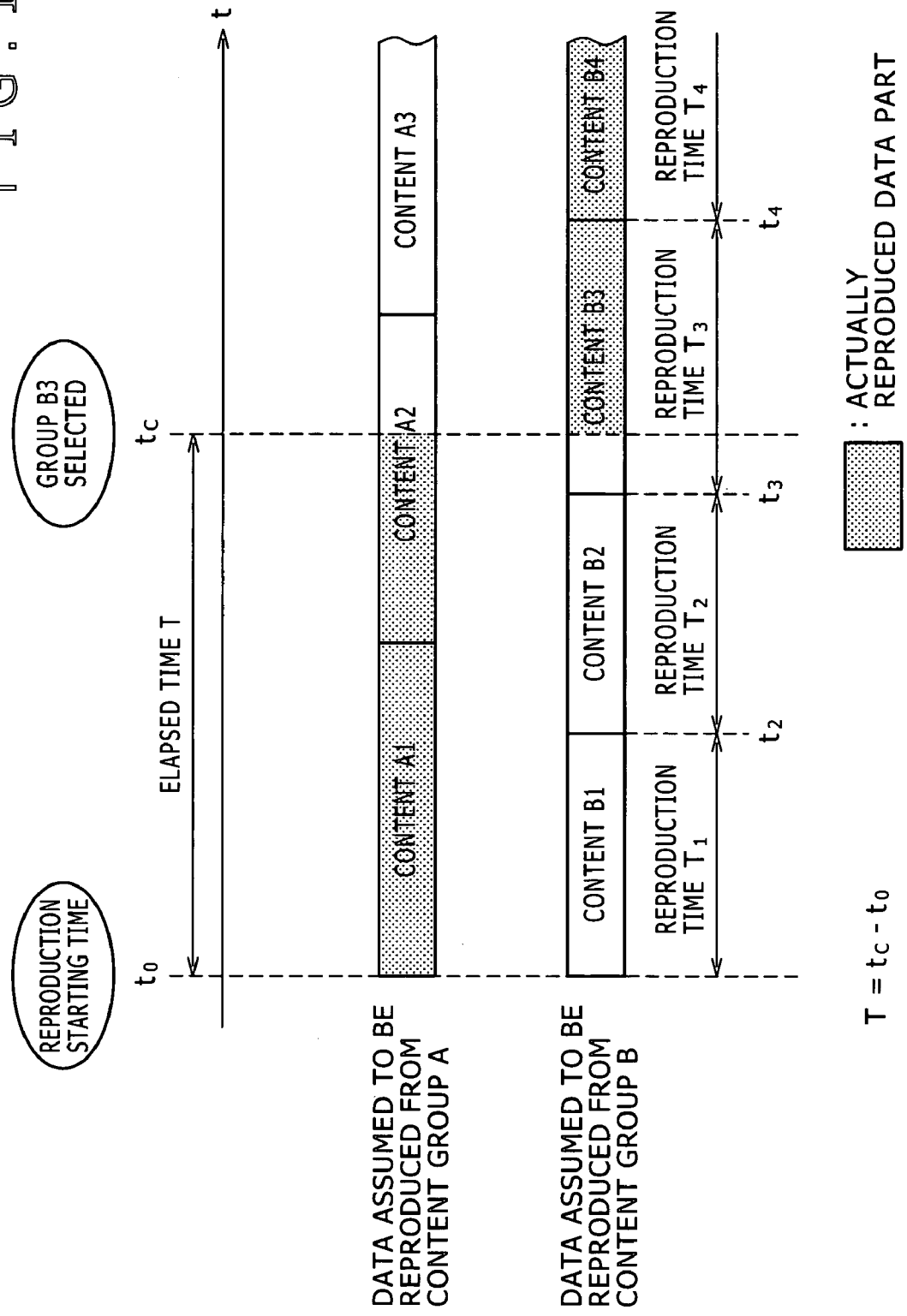
FIG. 15 is a conceptual view showing how contents are typically reproduced by the reproduction controlling method of FIG. 14.

What follows is a description of the reproduction controlling method according to the second embodiment of the present invention, practiced through the use of the reproduction control section 20 discussed above. The overall flow of processing by this reproduction controlling method is substantially the same as the flow of steps shown in FIG. 10 and explained above in connection with the first embodiment of the invention. The ensuing paragraphs will discuss in detail the flow of steps before and after the changeover from one content group to another, with reference to FIGS. 14 and 15. FIG. 14 is a flowchart of steps carried out by the reproduction controlling method of the second embodiment before and after a changeover from one content group to another. FIG. 15 is a conceptual view showing how contents are typically reproduced by the reproduction controlling method of FIG. 14.

As shown in FIG. 14, the content group A is first selected and reproduced and the reproduced data is output in step S100 (first reproducing step). With the content group A selected, the reproduction section 274 in the reproduction control section 260 reads and reproduces in sequentially continuous fashion contents A1, A2, etc., of the content group A from the content database 232 starting from a reproduction starting time t0, and causes the output unit 120 to output the reproduced data, as indicated in FIG. 15. In this case, contents B1, B2, etc., of the content group B are not actually reproduced but assumed to be reproduced and are solely subject to a time management scheme under which the elapsed time since the reproduction starting time t0 for the assumed reproduction is counted. The time management scheme illustratively involves making a cache of assumed reproduction starting times t0, t2, t3, t4 etc., for the contents B1, B2, B3, etc., in the RAM 203 or elsewhere.

Illustratively, the reproduction starting time t0 in the above setup is a point in time at which the content group A is first selected following start-up of the reproduction control section 260. All other content groups are assumed to be reproduced starting from the reproduction starting time t0 at which the stream reproduction of any one content group is actually started in stream reproduction mode.

In step S102, the content group B is selected at another time Tc for a changeover from channel A to channel B (group selecting step). On the basis of the user's selection input, the group selection section 250 selects the content group B in place of the content group A and outputs the result of the selection to the reproduction control section 260.

In step S104, based on the elapsed time T since the reproduction starting time t0, the content B3 to be reproduced following the content group changeover is selected. More specifically, as shown in FIG. 15, the reproduction content determination section 276 searches through data representing the assumed reproduction starting times t0, t2, t3, t4 etc., cached as mentioned above for the assumed time t3 prior to and nearest the point in time tc of the changeover, and identifies the content B3 as the content to be reproduced which corresponds to the assumed reproduction starting time t3 detected by the search.

In step S106, a reproduction starting position in the identified content B3 is determined. More specifically, the reproduction content determination section 276 computes a time difference between the content group changeover time tc and the assumed reproduction starting time t3 (i.e., tc−t3) for the identified content, performs calculations illustratively on the above-mentioned codec information so as to find that sample frame in the content B3 which corresponds to the calculated time difference, and determines the position of the calculated sample frame as the reproduction starting position. This reproduction starting position is a position where the content B3 is assumed to be reproduced at the content group changeover time tc.

In step S108, the identified content B3 is reproduced from the reproduction starting position determined as described above and the reproduced data is output (second reproducing step). More specifically, as shown in FIG. 15, the reproduction section 274 in the reproduction control section 260 reads the content B3 of the content group B in place of the content A2 of the content group A from the content database 232. In this case, the content B3 is reproduced starting from the reproduction starting position corresponding to the content group changeover time tc determined as discussed above. When reproduction of the content B3 is terminated, the content B4 and subsequent contents in the group are reproduced successively. The data reproduced in this manner from the content group B is output from the output unit 210.

As described above, the reproduction controlling method according to the second embodiment dispenses with multiple decoders for the reproducing apparatus 20 and provides instead time management whereby the contents in the content groups other than the group being reproduced are assumed to be reproduced continuously as content streams. Upon changeover from one content group to another, a content from the newly selected content group starts getting reproduced instantaneously for output. Compared with the first embodiment discussed earlier, the reproduction controlling method of the second embodiment is adapted advantageously to applications in which the control unit 201 of the reproducing apparatus 20 has a low throughput and the RAM 203 and other storage devices have a limited storage capacity. Upon changeover from one content group to another, the content B3 in the newly selected content group can be reproduced starting from the reproduction starting position that corresponds to the changeover time tc. This contributes to making the processing of a plurality of contents in simultaneous and parallel fashion a high degree of reality.

Figure 16:
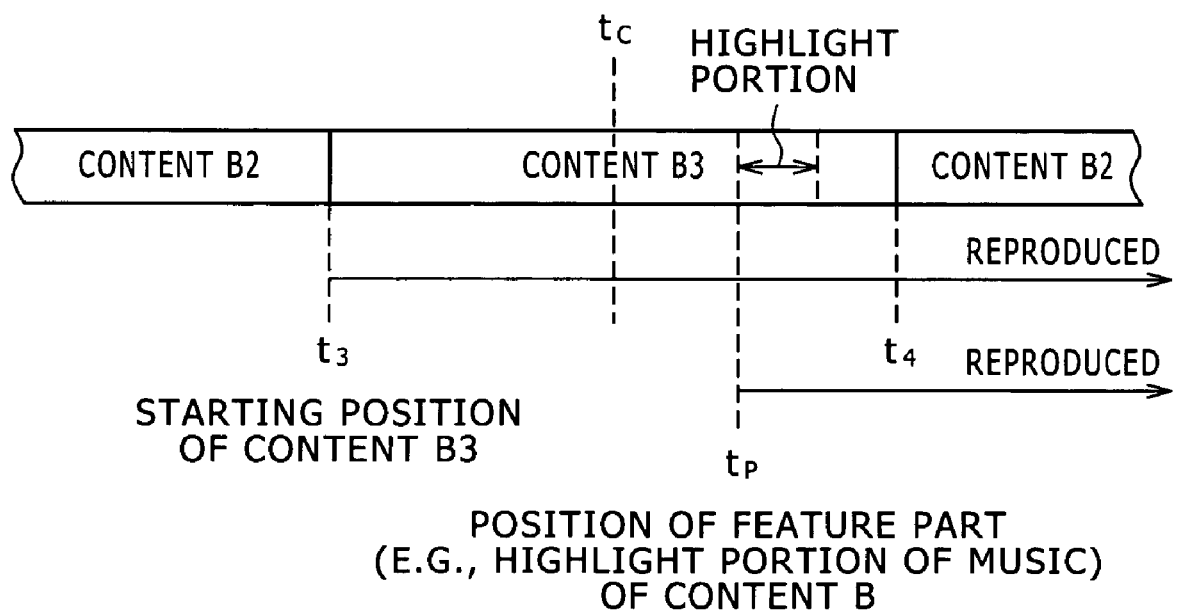
FIG. 16 is a schematic view showing how the content reproduction starting position of the content to be reproduced anew is modified upon changeover from one content group to another according to the reproduction controlling method of the second embodiment.

Explained below with reference to FIG. 16 is an example in which the reproduction starting position of the content to be reproduced anew is modified upon changeover from one content group to another (i.e., upon channel changeover). FIG. 16 is a schematic view showing how the content reproduction starting position of the content B3 to be reproduced anew is modified upon changeover from one content group to another according to the reproduction controlling method of the second embodiment.

In the example of FIG. 16, as in the case of FIG. 15, the content B3 in the content group B is shown determined by the reproduction content determination section 276 as the first content to be reproduced following changeover to the new content group.

As shown in FIG. 16, the reproduction starting position of the content B3 may be set at the beginning of this content (i.e., frame position corresponding to the assumed reproduction starting time t3 of the content B3). After that setting, a content will start being reproduced from its beginning whenever a new content group is selected. This satisfies the user's desire always to monitor contents from their beginning.

As indicated also in FIG. 16, the reproduction starting position of the content B3 may be set to a particular position representative of a feature part of this content (i.e., frame position corresponding to a feature part reproduction starting time tp). The feature part of the content B3 may illustratively be a highlight portion of a piece of music or any other part of the content which the user considers important in deciding whether or not the content in question is to his or her taste. The position of the feature part is determined in advance for each content by the producer of the content or by the user. Information representing such feature parts is stored in association with the contents to which they apply. More specifically, the information representative of the feature part may be attached directly to each content, or may be stored in the content database 232 in conjunction with each applicable content.

After the reproduction starting position of a given content in effect following changeover from one content group to another is set to a particular position indicative of the feature part of the content in question, that content will start getting reproduced from its feature part upon subsequent content group changeover. Because the feature part of the reproduced content can be monitored immediately after the changeover from one content group to another, the user can quickly determine whether the content in question is to his or her taste. Frequent content group changeovers (i.e., channel changes) thus provide an increased possibility that the user zapping through a very large number of contents in the content database 232 may serendipitously run across contents that are to the user's taste.

The foregoing has been the detailed description of the reproducing apparatus 20 and the reproduction controlling method for use therewith according to the first and the second embodiments of the present invention.

Where the above-described embodiments of the invention are in use, the target content to be reproduced can be selected from among huge numbers of stored contents not by the traditional, complicated operations for one-by-one content selection (e.g., by scrolls and selections on the input section 206) but by simple changeovers from one content group to another (channel changeovers).

The numerous stored contents may be reproduced continuously as content streams associated with content groups on a one-to-one basis for non-active monitoring by the user. This satisfies the user's desire to monitor contents passively without having to specify any particular preferences. Because contents are presented as streams when reproduced, the user is given more opportunities to come across hitherto-unselected contents or interesting portions halfway through unreproduced contents out of the very large number of stored contents on the storage medium such as the storage unit 208. This appreciably increases the possibility that yet-to-be monitored contents may be checked by the user and found to be to his or her taste. The user is thus able to rediscover preferred contents from the storage during casual content reproduction.

There are no overlapping contents between different content groups. This further raises the possibility that the user may stumble upon preferable contents through changeovers from one content group to another (channel changeovers).

After the changeover to a new content group, the user can return to and again monitor the preceding content group in the same manner as before. That is, because the contents of all content groups are placed under the appropriate time management scheme during reproduction of any content from any content group, the user can, earlier into reproduction of the newly selected content group (e.g., in several minutes), go back to the preceding content group (i.e., return to the preceding channel) to resume the monitoring of the previously selected contents. This is a clear difference from and a major advantage over the traditional "shuffle reproduction." The user is thus offered more convenience than ever when monitoring contents.

It should be understood by those skilled in the art that various modifications, combinations, sub-combinations and alterations may occur depending on design requirements and other factor in so far as they are within the scope of the appended claims or the equivalents thereof.

What is claimed is:

1. A reproducing apparatus comprising:
    a user operable input for generating a first input signal and a second input signal;
    a storage medium storing content data;
    a grouping section configured to group the content data into content groups;
    a group selection section configured to select a first one of the content groups in response to the first input signal and to select a second one of the content groups in response to the second input signal upon an elapsed time since a reproduction start time reaching a time Tc; and
    a reproduction control section configured to:
        reproduce the first content group;
        maintain the elapsed time since the reproduction start time;
        maintain reproduction starting times indicating at what times since the reproduction start time individual pieces of content data of the second one of the content groups would start being reproduced;
        compare the time Tc to the reproduction starting times for the individual pieces of content data of the second selected content group;
        determine one of the individual pieces of content data of the second selected content group based on the comparison; and
        after the second content group is selected upon the elapsed time since the reproduction start time reaching the time Tc, reproduce the second selected content group starting at the determined content data.

2. The reproducing apparatus according to claim 1, wherein the reproduction section reproduces the determined one of the individual pieces of content data starting from a starting position of the determined content data.

3. The reproducing apparatus according to claim 1, wherein the reproduction section reproduces the determined one of the individual pieces of content data starting from a position corresponding to the point in time of the selection.

4. The reproducing apparatus according to claim 1, wherein the reproduction section reproduces the determined content data starting from a predetermined position representative of a feature part of the determined one of the individual pieces of content data.

5. The reproducing apparatus according to claim 1, wherein the grouping section groups the content data into the content groups based on a selection input from the user.

6. The reproducing apparatus according to claim 1, wherein the grouping section groups the content data into the content groups based on information representative of a content data attribute.

7. The reproducing apparatus according to claim 6, wherein the grouping section groups the content data into the content groups in such a manner that the content data with a high monitoring frequency and the content data with a low monitoring frequency are distributed on a substantially even basis.

8. The reproducing apparatus according to claim 1, wherein the grouping section groups the content data into the content groups based on a content data monitoring frequency.

9. The reproducing apparatus according to claim 1, wherein the grouping section groups the content data randomly into the content groups.

10. The reproducing apparatus according to claim 1, wherein the reproduction starting time is a point in time at which the reproduction control section is started.

11. The reproducing apparatus according to claim 1, wherein the reproduction starting time is a point in time at which the selected content group is initially selected following start-up of the reproduction control section.

12. The reproducing apparatus according to claim 1, wherein the reproduction control section reproduces the first selected content group selected by the group selection section starting from a highlighted portion of one of a plurality of content data belonging to the first selected content group.

13. The reproducing apparatus according to claim 1, wherein the determined one of the individual pieces of content data is the content data of the second selected content group having a reproduction starting time prior to and nearest the time Tc.

14. The reproducing apparatus according to claim 1, wherein the reproduction section reproduces the determined content data starting from a time into the determined one of the individual nieces of content data equal to the difference between the time Tc and the reproduction starting time of the determined content data.

15. A reproduction controlling method comprising the steps of:
    generating an input signal from a user input;
    grouping content data stored on a storage medium into content groups;
    reproducing, in a sequentially continuous manner, content data belonging to a first content group for output starting from a predetermined reproduction start time;
    maintaining an elapsed time since the predetermined reproduction start time;
    maintaining reproduction starting times indicating at what times since the reproduction start time individual pieces of content data of a second content group;
    selecting the second content group in place of the first content group, in response to the input signal, upon the elapsed time reaching a time Tc;
    comparing the time Tc to the reproduction starting times for the individual pieces of content data of the second content group;
    determining one of the individual pieces of content data of the second content group based on the comparison; and
    after the second content group is selected at the time Tc, reproduce the second selected content group starting at the determined individual piece of content data.

16. A computer-readable medium storing a program for causing a computer to execute a method comprising:
    generating an input signal from a user input;
    grouping content data stored on a storage medium into content groups;
    reproducing, in a sequentially continuous manner, content data belonging to a first content group for output starting from a predetermined reproduction start time;
    maintaining an elapsed time since the predetermined reproduction start time;
    maintaining reproduction starting times indicating at what times since the reproduction start time individual pieces of content data of a second content group;

selecting the second content group in place of the first content group, in response to the input signal, upon the elapsed time reaching a time Tc;

comparing the time Tc to the reproduction starting times for the individual pieces of content data of the second content group;

determining one of the individual pieces of content data of the second content group based on the comparison; and after the second content group is selected at the time Tc, reproduce the second selected content group starting at the determined individual pieces of content data.

* * * * *